(12) United States Patent
Knisley

(10) Patent No.: US 10,625,557 B2
(45) Date of Patent: Apr. 21, 2020

(54) TILTING VEHICLE WITH NON-TILTING WHEELS

(71) Applicant: Franklin Ross Knisley, Granada Hills, CA (US)

(72) Inventor: Franklin Ross Knisley, Granada Hills, CA (US)

( * ) Notice: Subject to any disclaimer, the term of this patent is extended or adjusted under 35 U.S.C. 154(b) by 116 days.

(21) Appl. No.: 15/729,411

(22) Filed: Oct. 10, 2017

(65) Prior Publication Data

US 2019/0105959 A1    Apr. 11, 2019

(51) Int. Cl.

| | |
|---|---|
| *B60G 17/016* | (2006.01) |
| *B60G 21/04* | (2006.01) |
| *B62D 9/02* | (2006.01) |
| *B60L 13/04* | (2006.01) |
| *B62D 21/18* | (2006.01) |
| *B62K 5/10* | (2013.01) |
| *B62D 61/06* | (2006.01) |
| *B62D 24/00* | (2006.01) |
| *B62J 45/415* | (2020.01) |

(52) U.S. Cl.
CPC ......... *B60G 17/0162* (2013.01); *B60G 21/04* (2013.01); *B60L 13/04* (2013.01); *B62D 9/02* (2013.01); *B62D 21/18* (2013.01); *B62D 24/00* (2013.01); *B62D 61/065* (2013.01); *B62K 5/10* (2013.01); *B60G 2300/122* (2013.01); *B60G 2300/45* (2013.01); *B60G 2800/012* (2013.01); *B62J 45/4151* (2020.02)

(58) Field of Classification Search
CPC ................ B60G 17/0162; B60G 21/04; B60G 2300/122; B60G 2300/45; B60G 2800/012; B62D 61/065; B62D 24/00; B62D 21/18; B62D 9/02; B62K 5/10

See application file for complete search history.

(56) References Cited

U.S. PATENT DOCUMENTS

| | | | | |
|---|---|---|---|---|
| 2,076,786 A | * | 4/1937 | Kolbe ................... | B60G 11/00 280/124.103 |
| 3,792,748 A | * | 2/1974 | Regier ............. | B60G 17/01916 180/41 |
| 4,550,926 A | * | 11/1985 | MacIsaac ................. | B60G 3/18 280/124.103 |
| 4,974,863 A | * | 12/1990 | Patin ....................... | B62D 9/02 280/124.103 |
| 5,230,529 A | * | 7/1993 | Harvey-Bailey ........................... | B60G 17/0162 280/5.508 |
| 5,732,962 A | * | 3/1998 | Mageren .............. | B60G 21/106 280/124.103 |

(Continued)

*Primary Examiner* — Frank B Vanaman
(74) *Attorney, Agent, or Firm* — Edward P Dutkiewicz

(57) ABSTRACT

A narrow track tilting vehicle includes an undercarriage centered over a contact point, an upper chassis configured to pivot about a mobile longitudinal axis, and a cradle assembly configured to allow the mobile axis to move laterally relative to the contact point. In wheeled embodiments, the configuration of the carriage allows the upper chassis to tilt in response to centrifugal forces, while allowing the wheels to remain perpendicular to a level surface along which the vehicle is traveling. When the vehicle is traveling along a surface that is canted relative to the level surface, the configuration of the carriage allows to the upper chassis to remain upright relative to the level surface, and the wheels to extend perpendicular to the canted surface.

15 Claims, 28 Drawing Sheets

(56) References Cited

U.S. PATENT DOCUMENTS

| | | | | |
|---|---|---|---|---|
| 5,873,586 | A | * | 2/1999 | Krimmell ................ B60G 3/00 280/124.113 |
| 6,026,920 | A | * | 2/2000 | Obeda .............. B60G 17/01908 180/326 |
| 2006/0220331 | A1 | * | 10/2006 | Schafer ................ A01D 75/285 280/6.154 |
| 2013/0220110 | A1 | * | 8/2013 | Zhan .................. B60G 17/0165 91/459 |
| 2015/0123389 | A1 | * | 5/2015 | Goss .................... B60G 99/002 280/755 |
| 2018/0057050 | A1 | * | 3/2018 | Takenaka ............... B62D 6/002 |

* cited by examiner

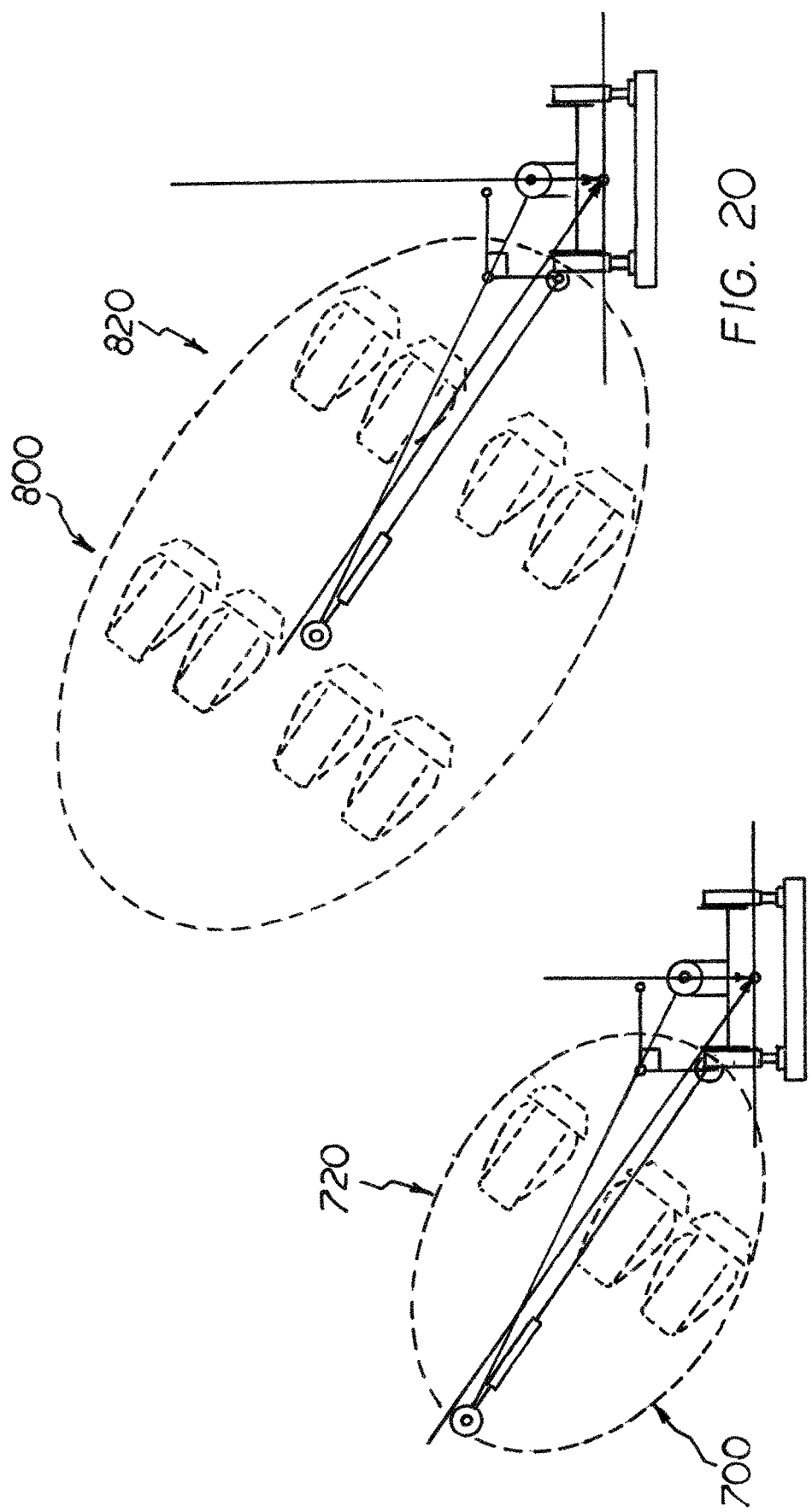

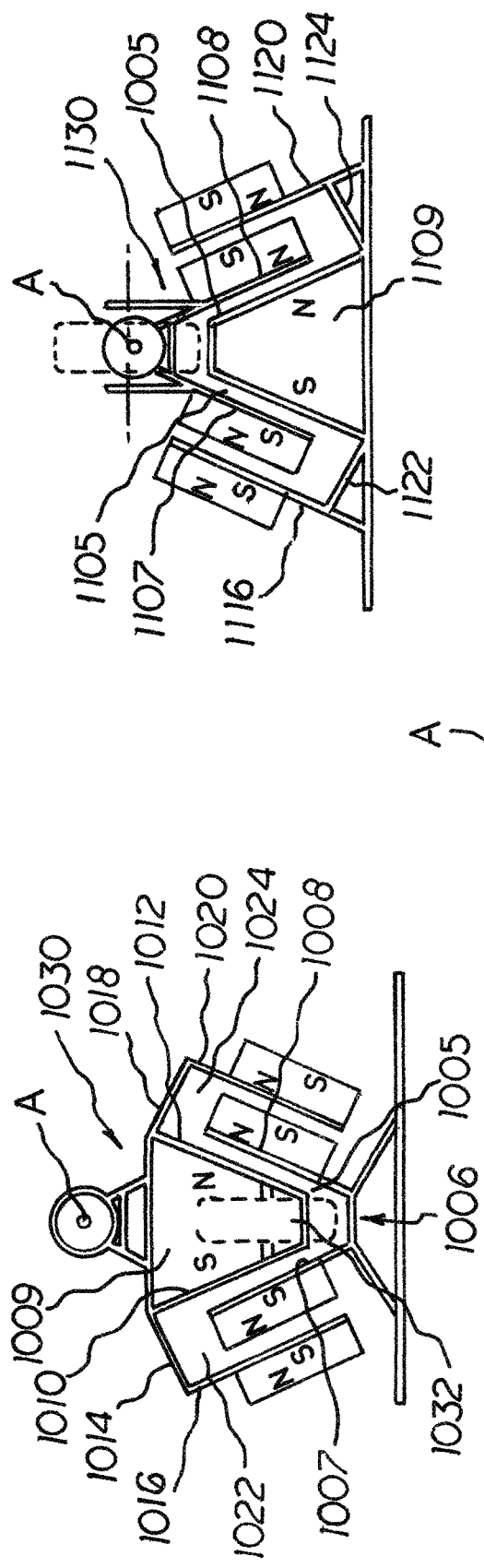
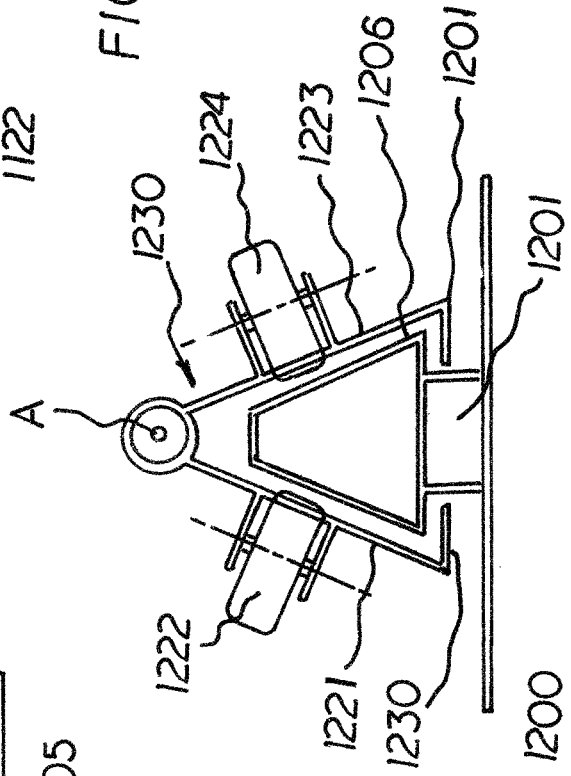
FIG. 24
FIG. 25
FIG. 26

TILTING VEHICLE WITH NON-TILTING WHEELS

PRIORITY OF INVENTION

This application claims priority from U.S. Provisional Application No. 62/405,263, filed Oct. 7, 2016, the contents of which are hereby incorporated herein by reference.

TECHNICAL FIELD

The present disclosure relates in general to land vehicles and more particularly to a vehicle having an upper chassis that can pivot and translate laterally relative to the undercarriage and wheels.

BACKGROUND

Wide track automobiles such as 4-wheeled automobiles are often occupied by only a single driver. Thus, they waste space that could more efficiently be used by a larger number of smaller, more maneuverable vehicles. Two-wheeled motorcycles, in contrast, are space-efficient, relatively economical, and fun to drive. One of their enjoyable traits is their ability to tilt when negotiating a curve. Three-wheeled motorcycles, also known as trikes, tend to be wider and are perceived to be more stable than two-wheelers, but current models are somewhat difficult to drive, since the driver needs to counterbalance the centrifugal forces on the trike by properly shifting his or her weight while cornering. In addition, since they are typically unenclosed, neither two-wheeled motorcycles nor conventional trikes offer adequate protection from inclement weather or from injuries due to accidents.

Various attempts have been made to design narrow-track vehicles that combine the best features of two-wheeled motorcycles, trikes, and four-wheeled automobiles. Some of these designs have allowed the vehicles to tilt when turning, but none have been entirely satisfactory. For instance, some designs employ tilting wheels, which require motorcycle-type tires having U-shaped profiles with reduced tire contact patches relative to the width of the tires. Other designs do not shift the vehicle's center of gravity far enough in a lateral direction to maintain equilibrium as cornering forces increase. Accordingly, none of the currently available narrow track vehicles are sufficiently stable during high-speed turns.

Tilting trains have also been designed to alleviate some of the discomfort experienced by train travelers when travelling along curves. However, the designs of these trains have resulted in only marginal improvement in cornering ability.

These and other problems are addressed by this disclosure as summarized below.

SUMMARY

A narrow track tilting vehicle includes an undercarriage centered over a contact point, an upper chassis configured to pivot about a mobile longitudinal axis, and a cradle assembly configured to allow the mobile axis to move laterally relative to the contact point. In some embodiments, the cradle assembly includes a swing arm that is mounted for pivoting movement about a main longitudinal axis that extends through the undercarriage and is parallel to the mobile longitudinal axis. One end of the swing arm is pivotably mounted to the undercarriage at the main longitudinal axis and the other end of the swing arm is pivotably coupled to an upper portion of the upper chassis at an upper pivot point that is slidable in a lengthwise direction along the upper chassis. The bottom end of the chassis is coupled to the swing arm by a crank comprising a crank arm perpendicular at one end to a first shaft and at the other end to a second shaft. The first shaft extends through an intermediate portion of the swing arm and defines a crank axis. The second shaft extends through the bottom end of the chassis and defines the mobile longitudinal axis. A motion conversion mechanism such as a parallelogram linkage is provided for transforming the rotational movement of the crank into lateral movement of the mobile longitudinal axis.

In another embodiment, the swing arm comprises a rod telescopically received in a tube that is pivotably secured to the undercarriage. A rod eye formed at one end of the rod is pivotably coupled to a pivot pin that projects from the upper chassis and defines the longitudinal axis.

In another embodiment, the cradle assembly comprises a slide bar mounted for sliding movement along the undercarriage in a lateral direction relative to the contact point. The upper chassis connects to the slide bar at a pivot point located along the mobile longitudinal axis, which extends perpendicular to the slide bar.

In some embodiments, the vehicle includes wheels rotatably coupled to the undercarriage, each of the wheels defining a vertical axis that extends perpendicular to a level contact surface when the vehicle is travelling in a substantially straight direction on the contact surface. The configuration of cradle assembly allows the chassis to tilt from a neutral position in which the vertical axis of the upper chassis is perpendicular to the contact surface to a leaning position in which the upper chassis extends at an upper chassis lean angle, while allowing the vertical axis of each wheel to remain perpendicular to the level contact surface and the undercarriage to remain parallel to the level contact surface. The wheels may be automobile-type tires that are flat throughout their full width and that remain fully engaged with the contact surface even when the chassis is in the leaning position.

The configuration of the cradle assembly also allows the chassis to remain in an upright position wherein the vertical axis of the upper chassis is perpendicular to a level reference surface when the vehicle is traveling on a canted contact surface extending at an oblique angle relative to the level reference surface. In embodiments where the vehicle has wheels, the vertical axis of each wheel extends perpendicular to the canted contact surface when the vehicle is traveling along the canted surface.

In other embodiments, the vehicle is a magnetic levitation (MAGLEV) vehicle, wherein the wheels are replaced with electromagnets having a polarity opposite to the polarity of an electromagnetic contact surface.

The vehicle may also include an actuation system that causes the upper chassis to tilt from the neutral position to the leaning position, and a control system that determines whether the upper chassis is leaning at the correct angle, and that energizes the actuation system to reposition the upper chassis when the lean angle is not correct.

BRIEF DESCRIPTION OF THE DRAWINGS

FIG. 19 is a diagrammatic end view showing a seating arrangement according to one embodiment of the railroad car of FIG. 18.

FIG. 20 is a diagrammatic end view showing a seating arrangement according to an alternate embodiment of the railroad car of FIG. 18.

FIG. 24 is a schematic end view showing an undercarriage and contact surface usable with the vehicle of FIG. 21.

FIG. 25 is a schematic end view showing an alternate embodiment of an undercarriage and contact surface usable with the vehicle of FIG. 21

FIG. 26 is a schematic end view showing another embodiment of an undercarriage and contact surface usable with the vehicle of FIG. 21

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
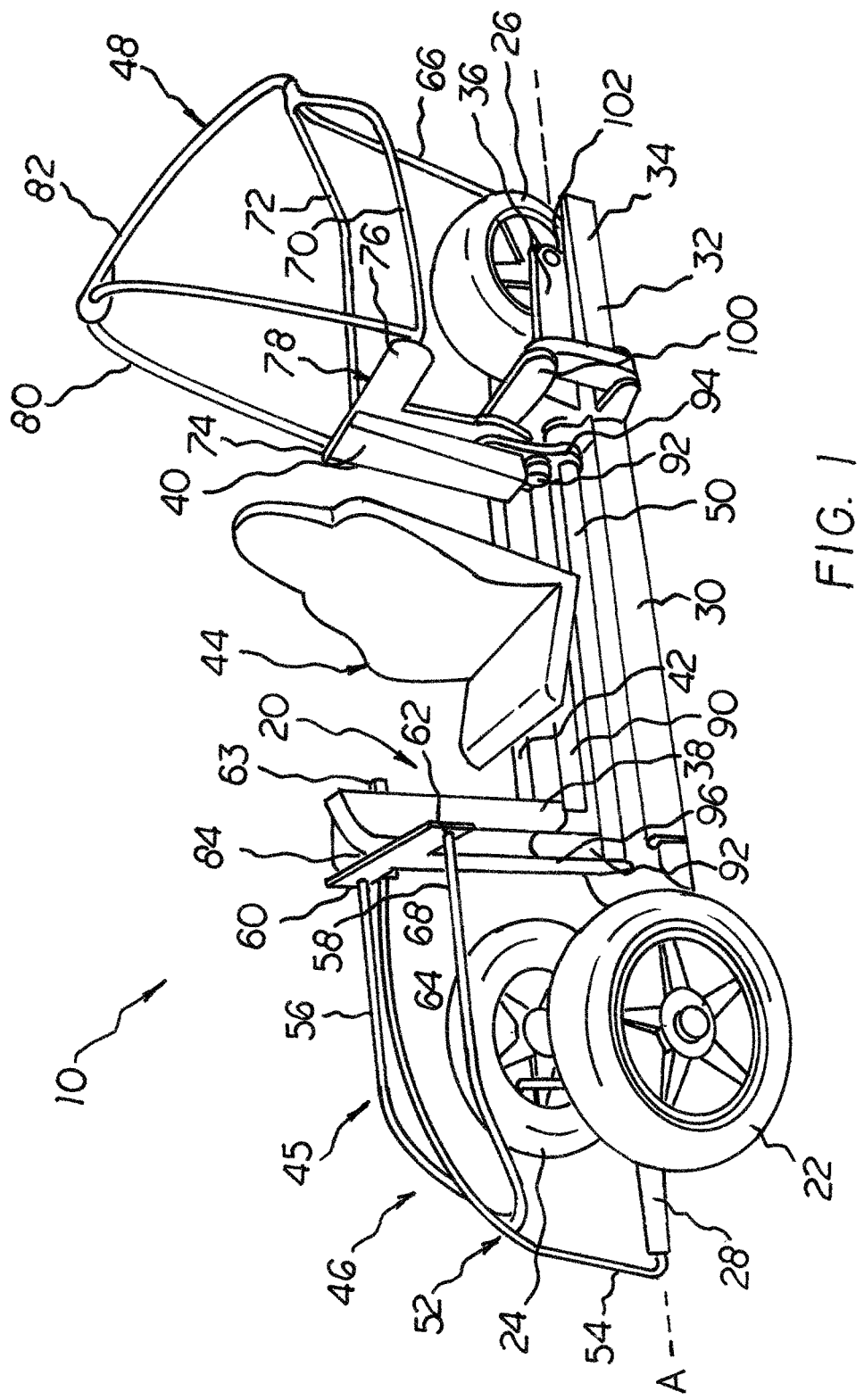
FIG. 1 is a perspective view of a vehicle according to this disclosure.

FIG. 1 shows a narrow tilting vehicle according to the present disclosure, indicated in its entirety by the numeral 10, in an upright position, also referred to herein as a neutral position, wherein the upper chassis 20 and the wheels 22, 24, and 26 are perpendicular to the pavement or other surface on which the vehicle rests. Although the illustrated example pertains to a reverse trike having two front wheels and a centrally located rear wheel, the principles of the disclosure can equally well be applied to a two- or four-wheeled vehicle, or to a conventional trike having a centrally located front wheel and two rear wheels.

The two front wheels 22, 24 in this embodiment are steerable and are coupled to opposite sides of the front end 28 of the undercarriage 30 by a solid front axle or a front suspension system having steering knuckles, while the rear wheel 26, which is equidistant from the front wheels 22, 24, is pivotably coupled to the rear end 34 of the undercarriage 30 by a rear suspension system including a swing fork 36. The front and rear suspension systems may be any type of common suspension system, such as trailing arm, leading link, or equal length A-arm, which does not allow camber change to the wheels 22, 24, 26.

The upper chassis 20, which includes a front post 38 joined to a rear post 40 by a longitudinally extending upper rod 42 that supports a driver's seat 44, is contained within a cradle 45 comprising a front cage 46, a rear cage 48, and a tubular base member 50. The front cage 46 includes a trident-shaped member 52 having a stem 54 that connects at its bottom end to the front end 28 of the undercarriage and at its top end to upper branches 56, 58 that connect to the opposite arms 60, 62 of a T-shaped swing arm 64. The rear cage 48 includes a vertical leg 66 that connects at its bottom end to the rear end 34 of the undercarriage 30 and at its top end to a pair of longitudinally extending arms 70, 72 secured at their front ends to the opposite arms 74, 76 of a T-shaped rear swing arm 78. The ends of the arms 74, 76 are also connected to the bottom ends of a vertical arch 80 that is supported at its apex by a strut 82 extending diagonally between the top of the arch 80 and the intersection of arms 70, 72. The tubular base member 50, which is connected at its front end to the bottom of swing arm 64 and at its rear end to the bottom of rear swing arm 78, defines a main longitudinal axis A about which both it and the upper chassis 20 pivot.

The front and rear cages 46, 48 serve as frames for a protective covering for the front and rear portions of the vehicle 10, but need not be limited to the configurations illustrated here, and in some embodiments, may be substantially eliminated without consequences to the basic principles of the disclosure. In some cases, removal of the front cage 46 and front portion of the chassis may even be advantageous, such as, for instance, when the vehicle is adapted for use with or as a wheelchair. Other adaptations to the framework of the vehicle 10, such as adding a roof or dome between the front and rear cages, may also be made.

The front and rear posts 38, 40 of the upper chassis 20 are coupled to the cradle 45 by means of front and rear vertical linear slides. In the illustrated embodiment, the front vertical linear slide comprises a front sliding pin 83 that projects rearwardly from the swing arm 64 of the chassis 20 and is received in a vertical slot 84 in the front post 38 of the cradle 45, and the rear vertical linear slide comprises a rear sliding pin 86 that projects forwardly from the rear swing arm 78 of the chassis and is received in a vertical slot 88 in the rear post 40 of the cradle 45. However, one skilled in the art will recognize that other types of linear slides may also be used.

A lower rod 90 extends longitudinally through, and is rotatable within, a bore at the lower end of the front and rear posts 38, 40. The front end of the lower rod 90 is coupled at a right angle to the lower end of a front crank arm 92, and the rear end of the lower rod 90 is coupled at a right angle to the lower end of a rear crank arm 94. The upper end of the front crank arm 92 is coupled at a right angle to a front shaft 96 mounted for rotation within a bore in the front swing arm 64 of the upper chassis, and the upper end of the rear crank arm 94 is coupled at a right angle to a rear shaft 98 mounted for rotation within a bore in the rear T-plate 78 of the chassis 20. The rear end of the rear shaft 98 is coupled to a horizontal control arm 100 that is part of a parallelogram linkage 102, best seen in FIGS. 2-4.

Figure 2:
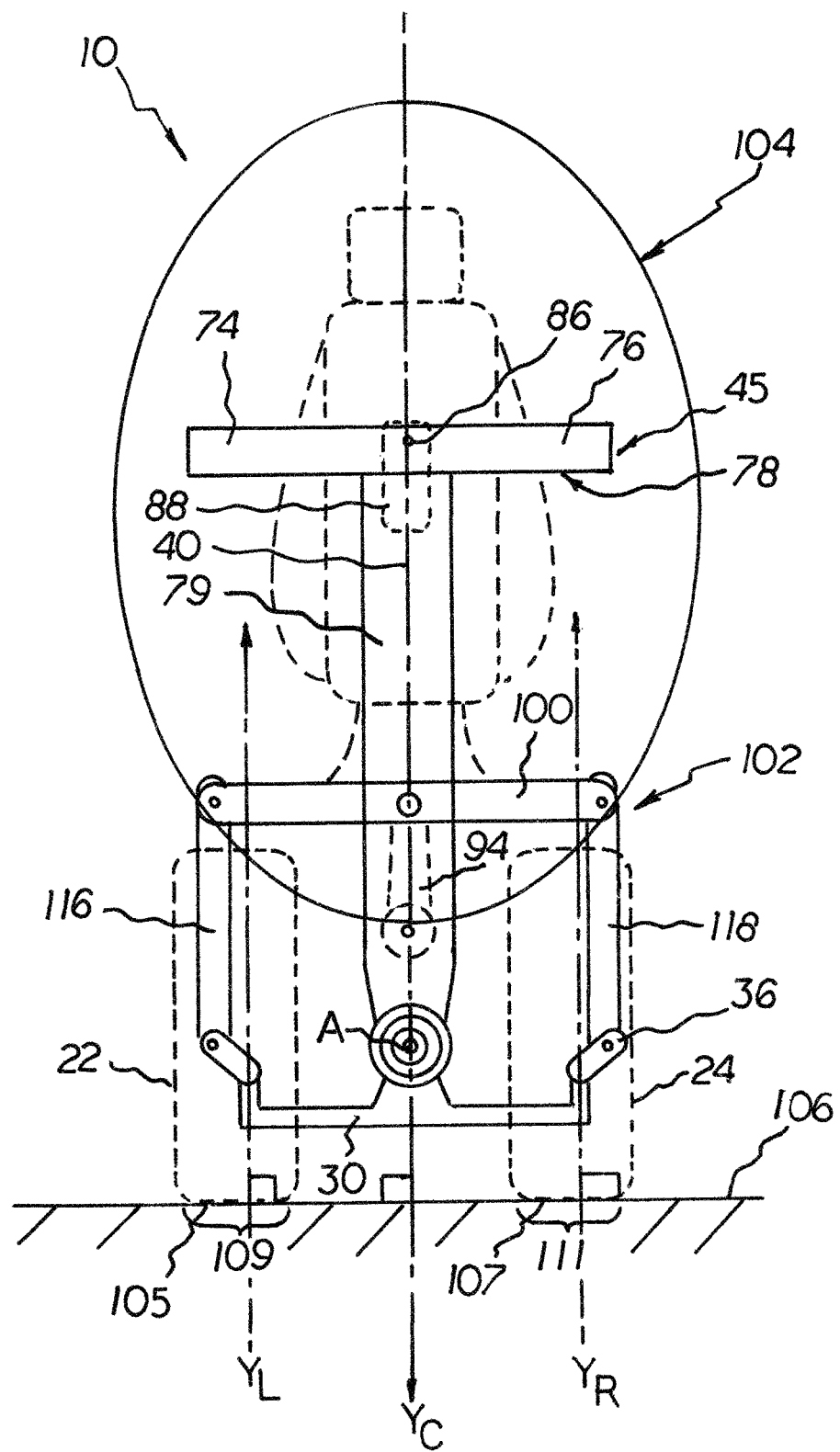
FIG. 2 is a schematic rear view showing the vehicle of FIG. 1 in a neutral position on a level surface.

FIG. 2 is a diagrammatic end view of the vehicle 10, wherein the reference numeral 104 identifies a simple enclosure or cabin supported on the chassis 20, and wherein the two front wheels 22, 24 are shown in phantom (alternatively, these may represent the rear wheels of a four-wheeled embodiment). As in FIG. 1, the vehicle 10 is in a neutral position, meaning that there is no centrifugal force acting on the vehicle. Thus, the vertical axis $Y_L$, $Y_R$ of each wheel 22, 24 is perpendicular to the level contact surface 106 on which the vehicle 10 is traveling, as is the rear swing arm 78 of the cradle 45, which is aligned with the vertical axis $Y_C$ of the chassis. All three wheels have automobile-type tires; that is, they have wide, flat bottom surfaces 105, 107 allowing wide contact patches 109, 111 with the surface 106.

In the neutral position, the bottom surface of the undercarriage 30 is parallel to the contact surface 106 as are the horizontal arms 74, 76 of the rear swing arm 78 and the horizontal control arm 100 of the parallelogram linkage 102. The trunk 79 of the rear swing arm 78, the two vertical control arms 116, 118 of the parallelogram linkage 102, and the rear crank arm 94 are perpendicular to the contact surface 106. A rear sliding pin 86 projects forwardly from the rear swing arm 78 and is received in the upper end of a vertical slot 88 formed in the rear post 40 of the chassis. The vertical trunk of the T-shaped front support member, the front crank arm, the front sliding pin, and the parallelogram linkage are in the same positions as their counterparts at the rear of the vehicle, although in a simplified embodiment, these front elements could be eliminated without compromising the basic principles of the disclosure. Alternatively, they could be eliminated from the rear and present only in the front.

Figure 3:
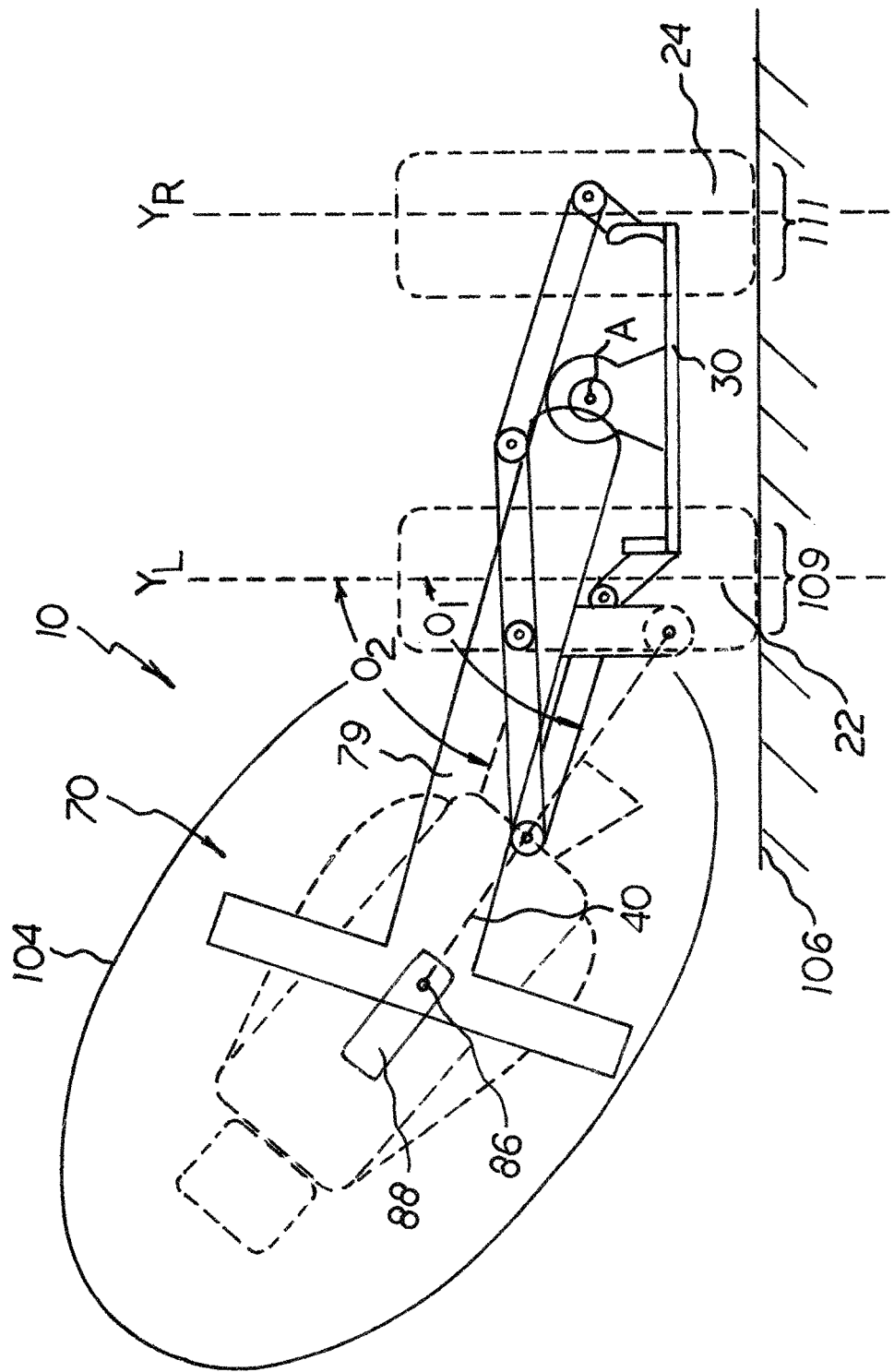
FIG. 3 is a schematic rear view showing the vehicle of FIG. 1 in a tilted position on a level surface

FIG. 3 is a diagrammatic end view, similar to FIG. 2 but with the cabin 104 of the vehicle 10 tilting to the left at a maximum upper chassis lean angle $\theta_1$ to counterbalance a rightward centrifugal force as the vehicle negotiates a curve having a turn radius centered to the left of the vehicle 10. As before, the bottom surface of the undercarriage 30 is parallel to the contact surface 106, and the vertical axes $Y_L$, $Y_R$ of the wheels 22, 24 are perpendicular to the contact surface 106. The size of contact patches 109, 111 between the tires and the contact surface 106 is the same as in FIG. 2. However, the rear post 40 of the upper chassis and the rear swing arm are no longer aligned with one another, and no longer perpendicular to the contact surface 106. Instead, the rear post 40 extends at the upper chassis lean angle $\theta_1$ away from vertical, and the rear swing arm 40 extends at a swing arm lean angle $\theta_2$ away from vertical, with $\theta_1 > \theta_2$. In addition, the rear sliding pin 86 of the rear swing arm 78 is now at the bottom of the vertical slot 88 in the rear post 40 of the upper chassis.

Figure 4:
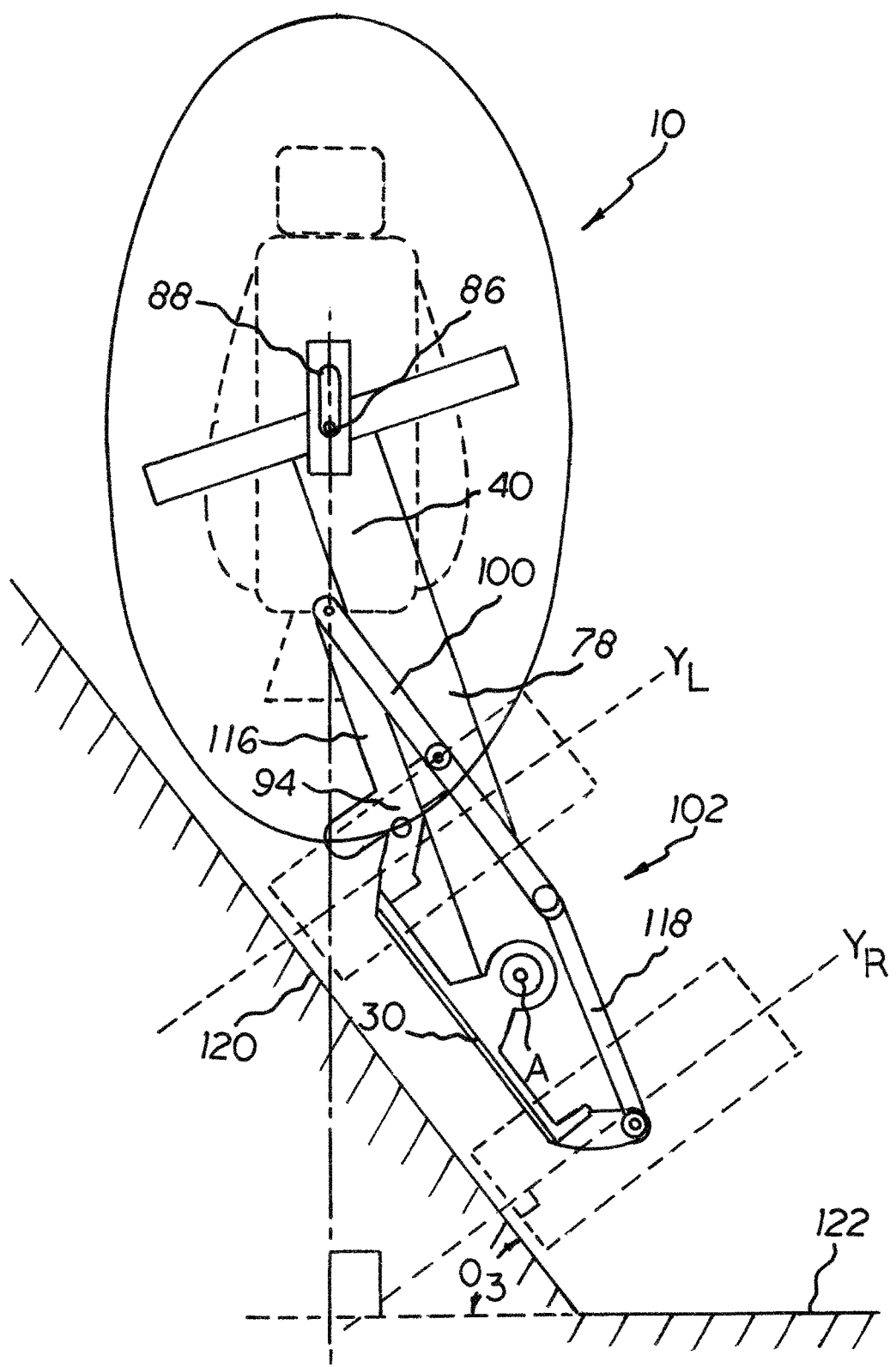
FIG. 4 is a schematic rear view showing the vehicle of FIG. 1 on a canted surface.

FIG. 4 is a diagrammatic end view, similar to FIGS. 2 and 3, but with the vehicle 10 being driven on a tilted contact surface 120 that extends at a maximum cant angle $\theta_3$ with respect to level ground 122. The bottom surface of the undercarriage 30 is parallel to the contact surface 120, and the vertical axis $Y_L$, $Y_R$ of each wheel 22, 24 is perpendicular to the contact surface 120, with full contact between the tire bottoms and the contact surface 120. The rear swing arm 78 has pivoted in a counterclockwise direction away from its original upright position. The vertical arms 116, 118 of the parallelogram linkage 102 have also pivoted counterclockwise, causing the horizontal arm 100 to tilt to an orientation parallel to the contact surface 120, and the crank arm 94 to swing out of alignment with the rear swing arm 78. The rear sliding pin 86 projecting from the rear swing arm 78 has moved to its lowermost position in the slot 88 in the rear post 40 of the upper chassis, and the rear post has pivoted around the pin 86, causing the rear post (and the rest of the upper chassis) to assume an orientation perpendicular to level ground 122.

Figure 5:
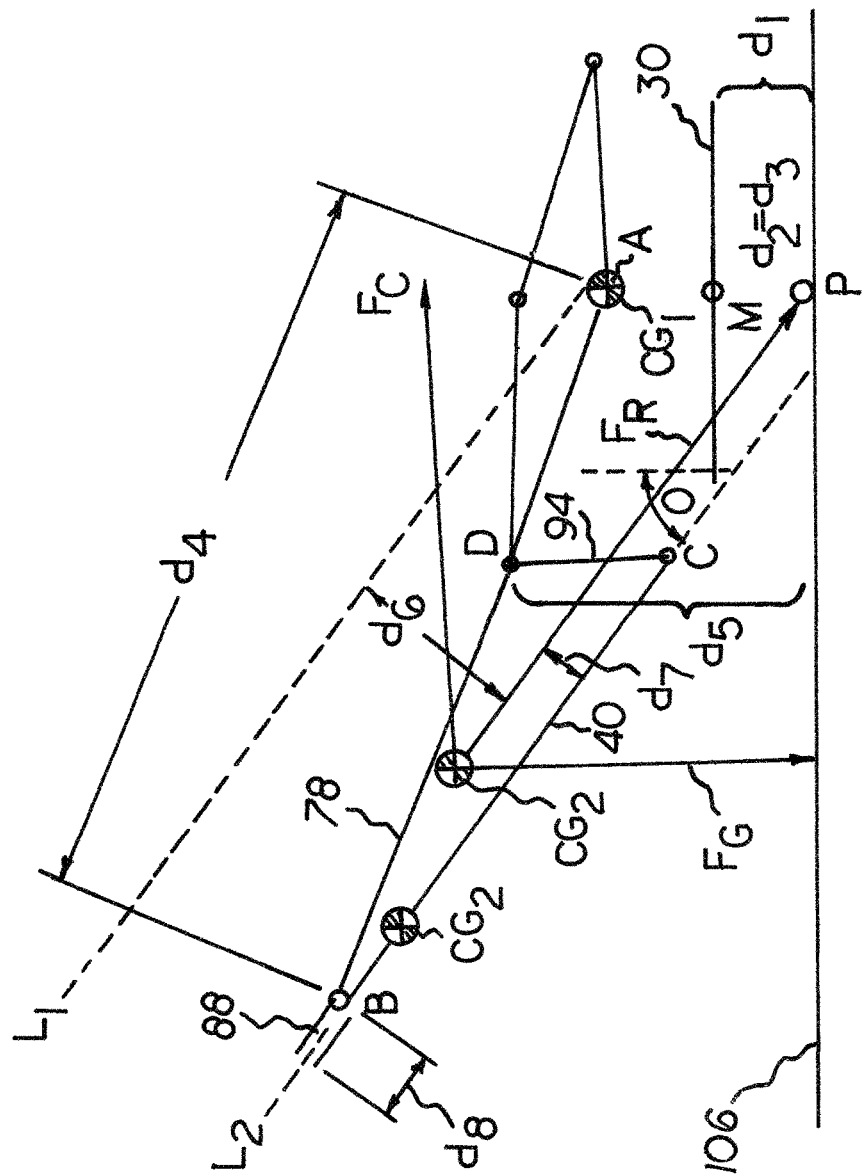
FIG. 5 is a simplified end view incorporating a free body diagram of the forces acting on the vehicle in FIG. 3.

The forces acting on the vehicle in the tilted position of FIG. 3 are shown in the simplified free body diagram of FIG. 5, where $CG_1$ represents the center of gravity of the undercarriage 30, $CG_2$ represents the center of gravity of the upper chassis, and $CG_C$ represents the combined center of gravity. When turning, the vehicle experiences a gravitational force represented by the vector Fg and a centrifugal force represented by the vector Fc, together producing a resultant force $F_R$ directed at a pivot point P located beneath the midpoint M of the undercarriage 30. For purposes of simplification, aerodynamics forces and tire slip angle/tire deflection have been taken to be zero.

Using the free body diagram of FIG. 5, one skilled in the art will be able to design a vehicle of the type shown in FIGS. 1-4 by selecting the following parameters: 1) the desired maximum lean angle $\theta_1$; 2) the vertical distance $d_1$ between the contact surface 106 and bottom surface of the undercarriage 30; 3) the vertical distance $d_2$ between the contact surface 106 and the undercarriage center of gravity $CG_1$; 4) the vertical distance $d_3$ from the contact surface 106 to the main longitudinal axis A (which in the illustrated embodiment coincides with the undercarriage center of gravity $CG_1$; therefore $d_3=d_2$); 5) the distance $d_4$ between the main longitudinal axis A and the pin longitudinal axis B; 6)

the minimum distance $d_5$ between the crank axis D and the contact surface 106 when the rear post 40 of the upper chassis is tilted at the maximum lean angle $\theta_1$ with respect to the contact surface 106 (with allowances made for factors such as ground clearance/suspension travel and the thickness of the various pivotal connections); and 7) the counterbalance (or leverage) ratio (ie. the ratio of the weight of the upper chassis to the weight of the undercarriage, which determines the amount of offset required for the weight of the upper chassis to counterbalance the weight of the undercarriage). A vehicle according the present disclosure has been designed with a counterbalance ratio of 3:1 and has been shown to withstand 1 g of gravitational force combined with 1.25 g in centrifugal force, resulting in a maximum lean angle of 52°.

The length and position of the crank arm 94 and the rear swing arm 78 of the upper chassis may be determined graphically using the following steps: 1) draw a first reference line $L_1$ extending parallel to the resultant force vector $F_R$ and through the undercarriage center of gravity $CG_1$; 2) measure the length $d_6$ of a line extending perpendicularly between the first reference line $L_1$ and the resultant force vector $F_R$, and divide this distance by the counterbalance ratio to determine an offset distance $d_7$; 3) draw a second reference line $L_2$ parallel to the first reference line $L_1$ and offset from the resultant force vector $F_R$ by a distance $d_7$ along a line extending perpendicularly between the resultant force vector $F_R$ and the second reference line $L_2$, on the opposite side of the force vector $F_R$ from the first reference line L; 4) locate mobile longitudinal axis C along second reference line $L_2$, directly below crank axis D. The crank arm 94 is represented by the line connecting the mobile longitudinal axis C to the crank axis D, and the rear swing arm 78 is represented by a line connecting the crank axis D to the pin 86. Finally, measure the distance between the pin longitudinal axis B and the mobile longitudinal axis C when the upper chassis is at its maximum lean angle $\theta_1$ and subtract it from the distance between the pin longitudinal axis B and the mobile longitudinal axis C when the upper chassis is in the neutral position to determine the length $d_8$ of the slot 88 along which the sliding pin 86 travels.

Figure 6A:
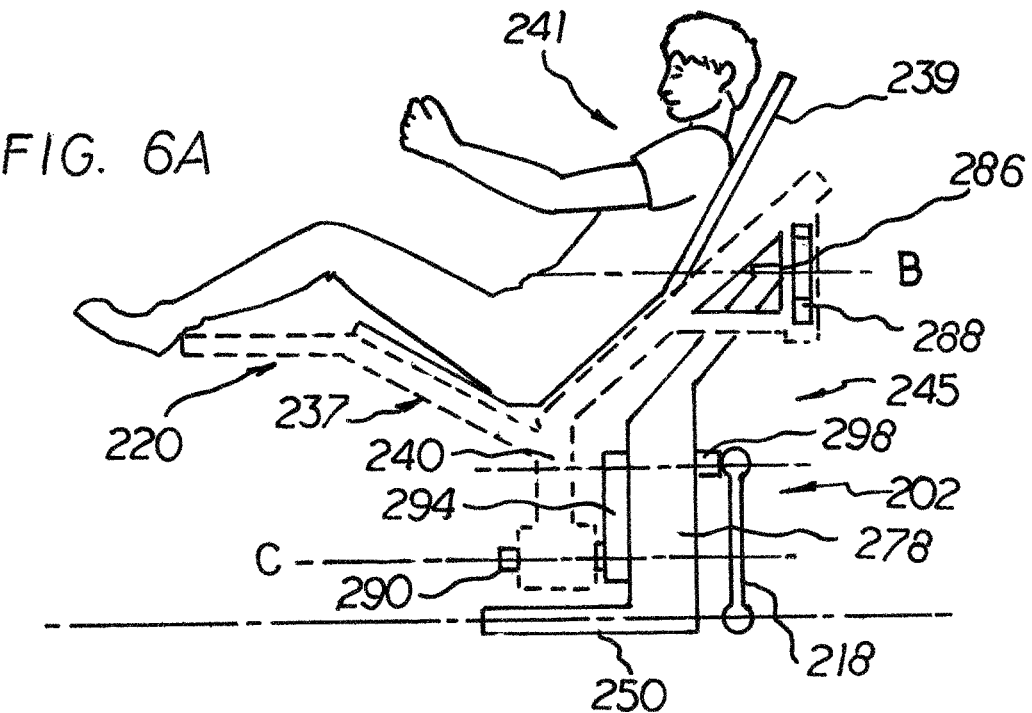
FIG. 6A is a simplified side view of an alternate embodiment of the invention.

FIG. 6A is a diagrammatic side view showing a simplified embodiment that is essentially the same as the embodiment of FIGS. 1-4, except that the front portion of the cradle 245 has been eliminated. The upper chassis 220 has a generally V-shaped upper portion 237 and a vertical lower portion 240. The upper portion 237 supports a seat 239 for a driver 241 in a recumbent position. The lower portion 240 is analogous to the rear post 40 in the embodiment of FIGS. 1-4. The cradle 245 comprises a horizontal base 250 analogous to the tubular base member 50 of FIGS. 1-4 and an upright swing arm 278 analogous to the swing arm 78 of FIGS. 1-4. The horizontal base 250 defines a main longitudinal axis A about which the entire cradle 245 rotates. The upper end of the swing arm 278 supports a sliding pin 286 that defines the pin longitudinal axis B and is slidably received in a vertical slot 288 at the upper end of the Y-shaped seat support 240. The lower end 240 of the upper chassis 220 is connected to the cradle 245 by a crank mechanism that comprises a crank arm 294, a first shaft 290 and a second shaft 298. The first shaft 290 of the crank extends through a bore in the lower end 240 of the upper chassis and defines a first crank longitudinal axis C that will be referred to herein as the mobile longitudinal axis, since it translates laterally relative to the contact point P. The second shaft 298 of the crank extends through a bore in the swing arm 278 and defines a second crank longitudinal axis D. The rear end of upper shaft 290 of the crank 294 is secured at a right angle to the parallelogram linkage 202 (only one vertical arm 218 of which is visible in this figure). The parallelogram linkage 202 acts as a motion conversion mechanism that transforms rotational movement of the crank into lateral translation of the chassis. One skilled in the art will recognized that other motion conversion mechanisms such as gears could also be used without deviating from the principles of the invention.

Figure 6B:
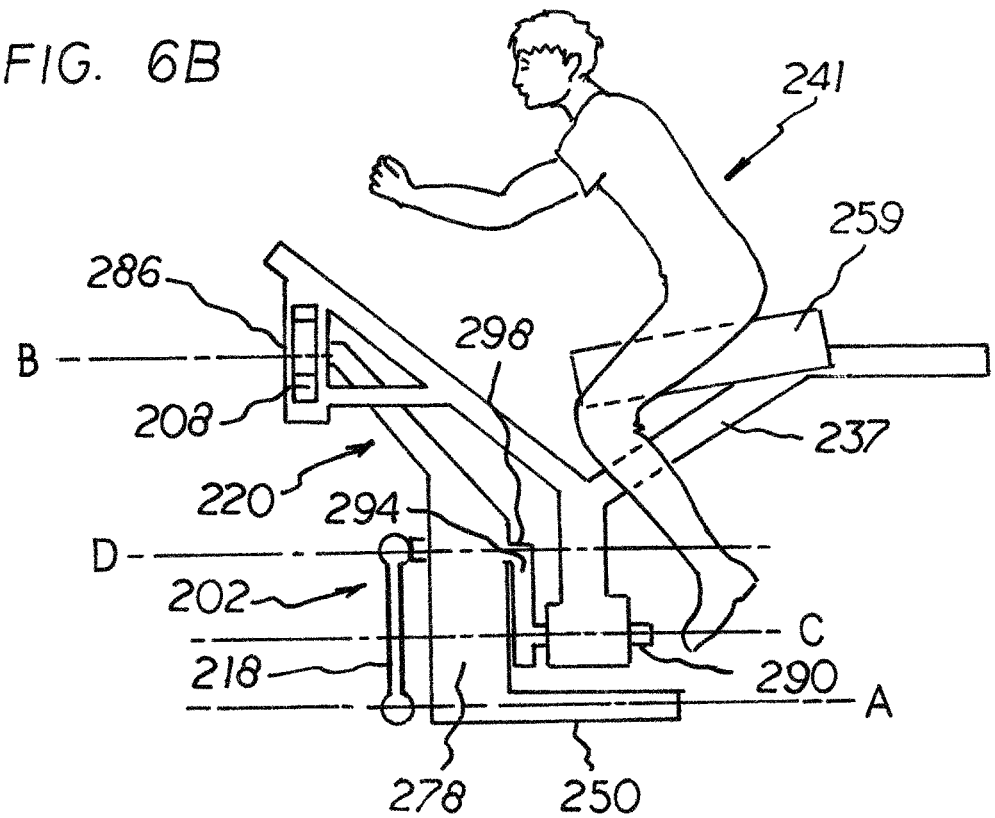
FIG. 6B is simplified side view another embodiment of the invention.

The embodiment of FIG. 6B is identical to the embodiment of FIG. 6A, except that the cradle and chassis have been reversed so that the swing arm 278 and its connected components are now located at the front end of the vehicle, and the recumbent-type seat has been replaced with a conventional motorcycle-type seat allowing the driver 241 to sit in an upright or forwardly leaning position. The embodiment of FIG. 6B may be preferred for two-wheeled vehicles, while the embodiment of FIG. 6A may be preferred for three-wheeled and four-wheeled vehicles.

Figure 7:
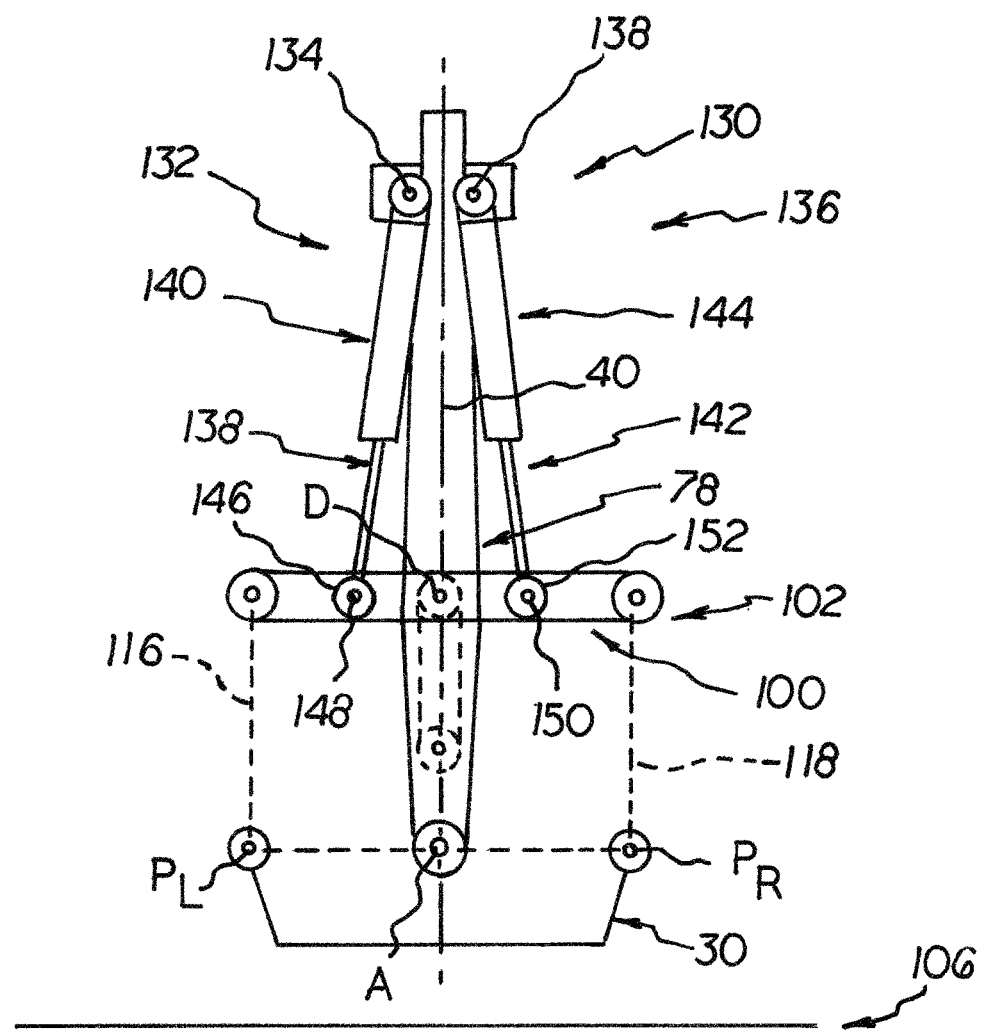
FIG. 7 is a schematic side view of one embodiment of an actuation assembly for a vehicle according to this disclosure.
Figure 8:
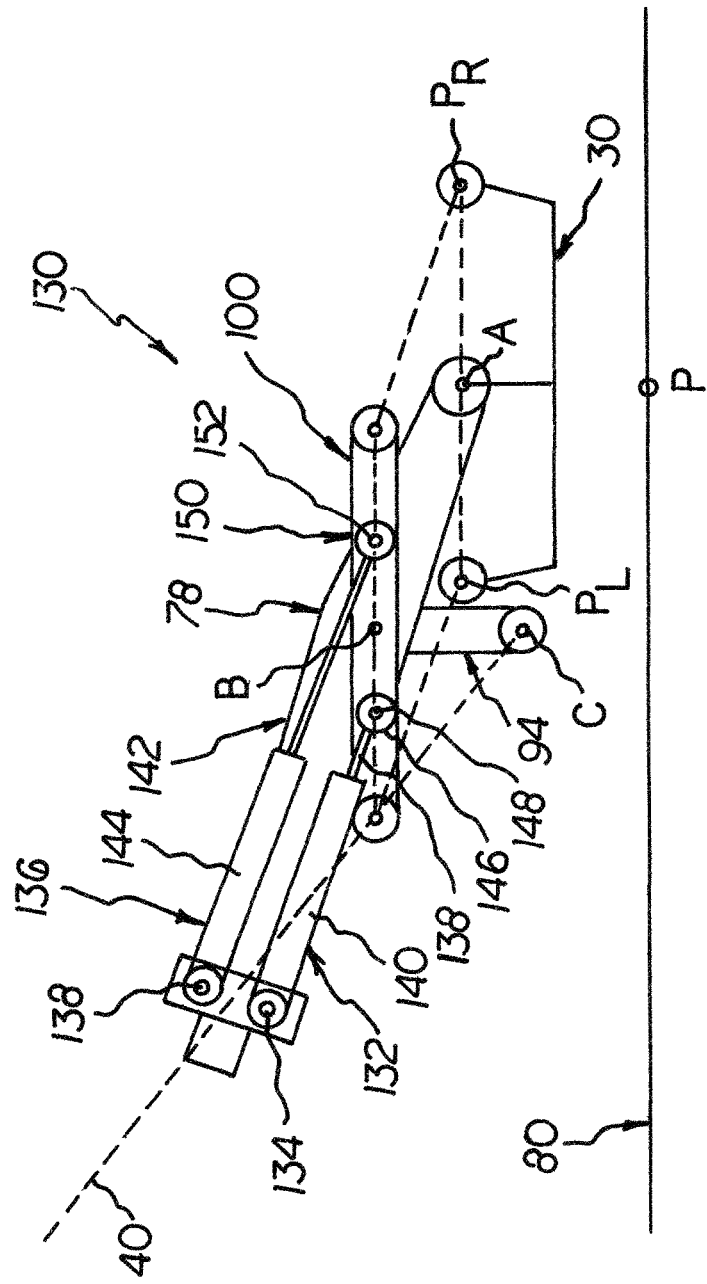
FIG. 8 is a schematic side view showing the actuation assembly of FIG. 7 in a tilted configuration.

FIGS. 7 and 8 are end views showing a hydraulic actuation assembly 130 that may be mounted on the rear swing arm 78 of the cradle of the vehicle shown in FIGS. 1-4, where FIG. 7 shows the assembly in the neutral position of FIG. 2 and FIG. 8 shows the assembly in the tilted position of FIG. 3. This assembly is intended only as an example, since one skilled in the art would recognize that other types of actuators, including but not limited to pneumatic, hydropneumatic, electrical, or mechanical linear or rotary actuators may also be used, and may be positioned at locations other than the rear swing arm, without deviating from the scope of the disclosure.

The illustrated assembly comprises a left-side hydraulic actuator 132 that extends downwardly from a left-side pivot 134 mounted on the left of the rear swing arm 78, and a right-side hydraulic actuator 136 that extends downwardly from a right-side pivot 138 mounted on the right of the rear swing arm 78. The left-side hydraulic actuator 132 includes a left-side piston rod 138 that reciprocates in and out of a left-side cylinder 140, and the right-side hydraulic actuator 132 includes a right-side piston rod 142 that reciprocates in and out of a right-side cylinder 144. The left-side piston rod 138 terminates in a left-side rod eye 146 that is rotatable about a first projection 148 extending from the left side of the horizontal control arm 100 of the parallelogram linkage 102, and the right-side piston rod 138 terminates in a right-side rod eye 150 that is rotatable about a second projection 152 extending from the right side of the horizontal control arm 100.

Movement of the upper chassis from the neutral position shown in FIG. 7 to the tilted position shown in FIG. 8 is accomplished by simultaneously retracting the left-side piston rod 138 into the left-side cylinder 140 and extending the right-side piston rod 142 out of the right-side cylinder 144. This exerts a clockwise torque on the horizontal control arm 100 at the crank axis D, which the parallelogram linkage 102 counteracts with a counter-clockwise torque, causing the vertical control arms 116, 118 to pivot to the left about their connection points $P_L$, $P_R$ with the undercarriage 30. The horizontal control arm 100 moves left as well, causing the crank arm 94 and the rear post 40 of the upper chassis to translate leftwards, as well as to pivot about the mobile longitudinal axis C, while the rear swing arm 78 of the cradle pivots about the main longitudinal axis A.

Figure 9:
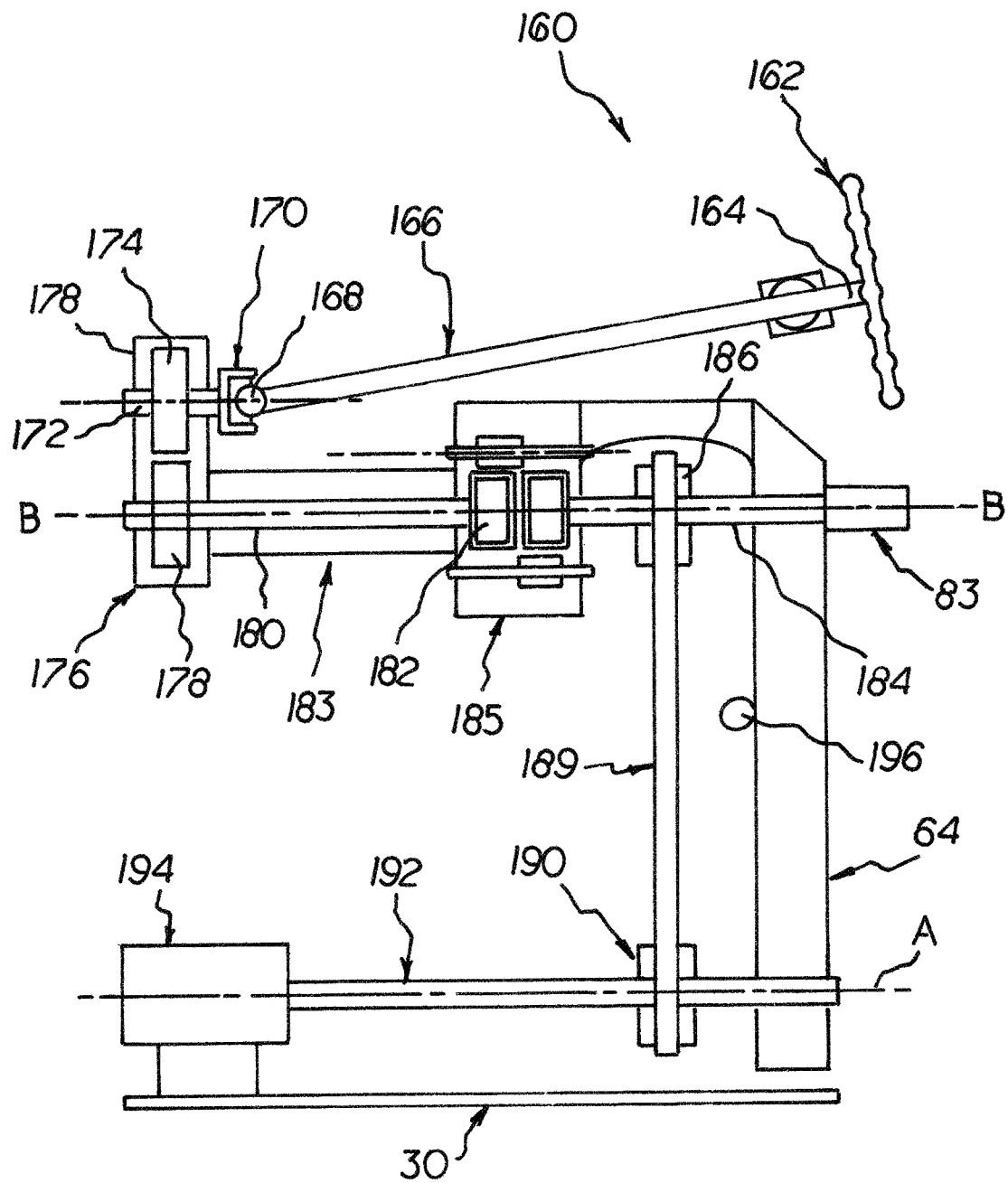
FIG. 9 is a schematic side view of one embodiment of a steering assembly for a vehicle according to this disclosure.

A steering assembly 160 for the vehicle of FIGS. 1-4, shown diagrammatically in FIG. 9, comprises a steering wheel 162 mounted at the rear end 164 of a first steering input shaft 166 that is connected at its forward end to a rotatable universal joint 168 mounted in a yoke 170. The yoke 170 is connected to a rod 172 that extends through the center of an upper gear 174 rotatably mounted in a gear housing 176. The upper gear 174 engages a lower gear 178, also rotatably mounted in the gear housing 176. The lower gear 178 is connected at its center to the front end of a second steering input shaft 180 that extends rearwardly along, and is rotatable about, the longitudinal axis B of the front sliding pin 83. The rear end of the second steering input shaft 180 is connected to a steering differential gear set 182, which in turn is connected to a third steering input shaft 184. The second steering input shaft 180 is enclosed within a protective tube 183 that extends between the gear housing 176 and the differential gear housing 185. The third steering input shaft 184 extends rearwardly along the pin longitudinal axis B and is secured at its rear end to the front swing arm 64 of the chassis. An upper toothed pulley 186 is mounted on the third steering input shaft 184 between the differential gear set 182 and the swing arm 64. The upper toothed pulley 186 is connected by a toothed belt 189 to a lower toothed pulley 190 that is mounted on a steering output shaft 192 which rotates about the main longitudinal axis A of the upper chassis. The front end of the steering output shaft 192 is secured to a steering box 194 that is supported on the undercarriage 30, and the rear end of the steering output shaft is secured to the bottom end of the swing arm 64, which is also supported on the undercarriage 30. This configuration of the steering assembly prevents the steering wheel 162 and the steering box 194 from being influenced by the side-to-side movement of the upper chassis. In addition, the configuration saves space, since the pulleys 186, 190 and belt 189 are located inside the hollow interior 196 of the swing arm 64.

Figure 10:
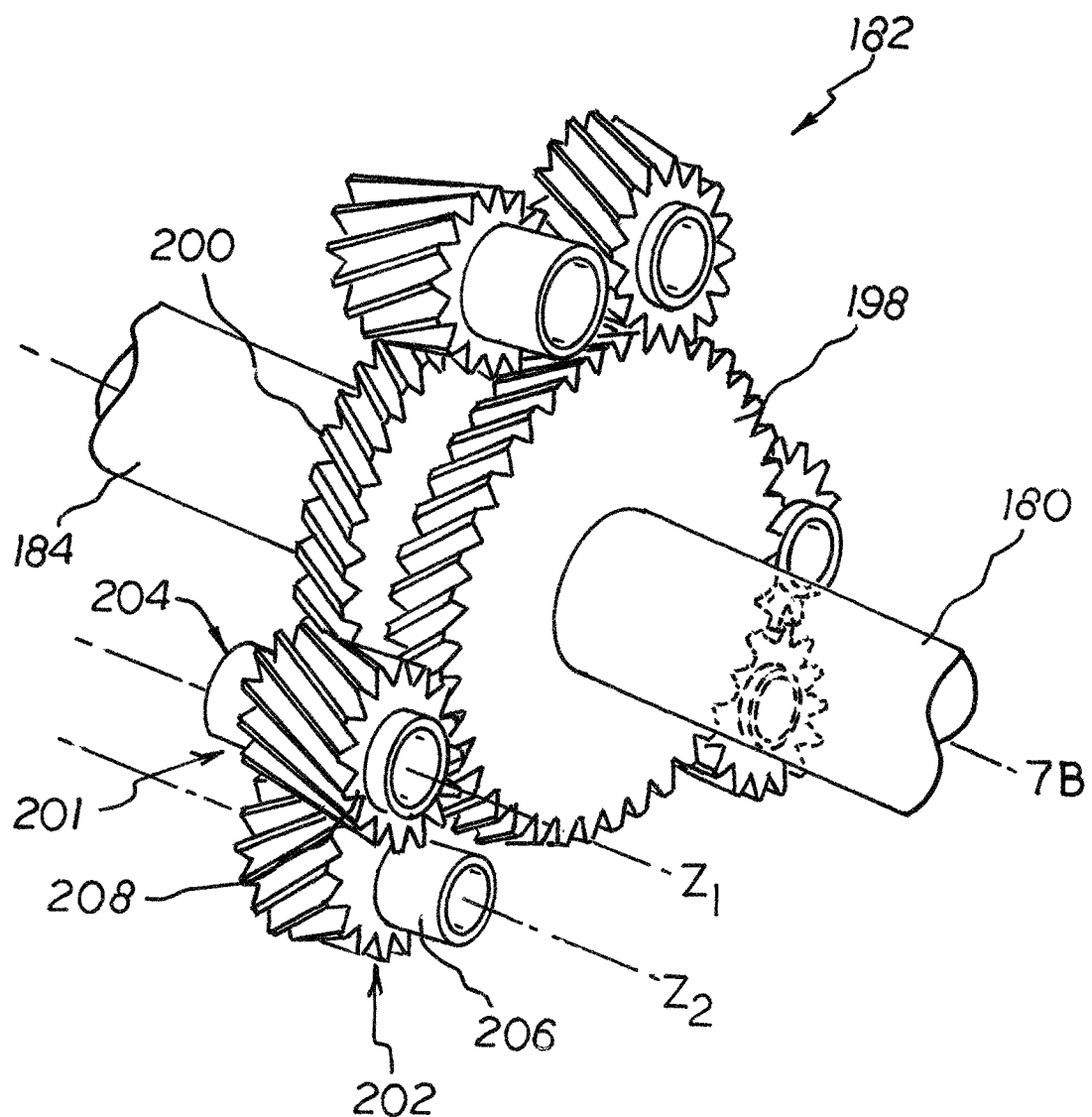
FIG. 10 is a perspective view of a differential gear set in the steering assembly of FIG. 9.

The steering differential gear set 182, shown in detail in FIG. 10, includes a bi-axial input sun gear 198 mounted on the second steering input shaft 180 and a biaxial output sun gear 200 mounted on the third steering input shaft 184. The input sun gear 198 meshes with at least one cylindrical (three shown here) planetary input gear 201 having an axis $Z_1$ parallel to the pin longitudinal axis B. Each planetary input gear 198 meshes with a corresponding cylindrical planetary output gear 202 that has an axis $Z_2$ parallel to the pin longitudinal axis B. Each planetary output gear 202 meshes with the output sun gear 200. A cutout portion in the rear end of the planetary input gear 201 prevents the planetary input gear 201 from meshing with the output sun gear 200, and a cutout portion 206 in the front end of the planetary output gear 202 prevents the planetary output gear 202 from meshing with the input sun gear 198. Thus, rotation of the input sun gear 198 in a first direction causes rotation of the planetary input gear 201 in a second, opposite direction. This, in turn, causes rotation of the planetary output gear 202 in the first direction, causing the output sun gear 200 to rotate in the second direction.

Figure 11:
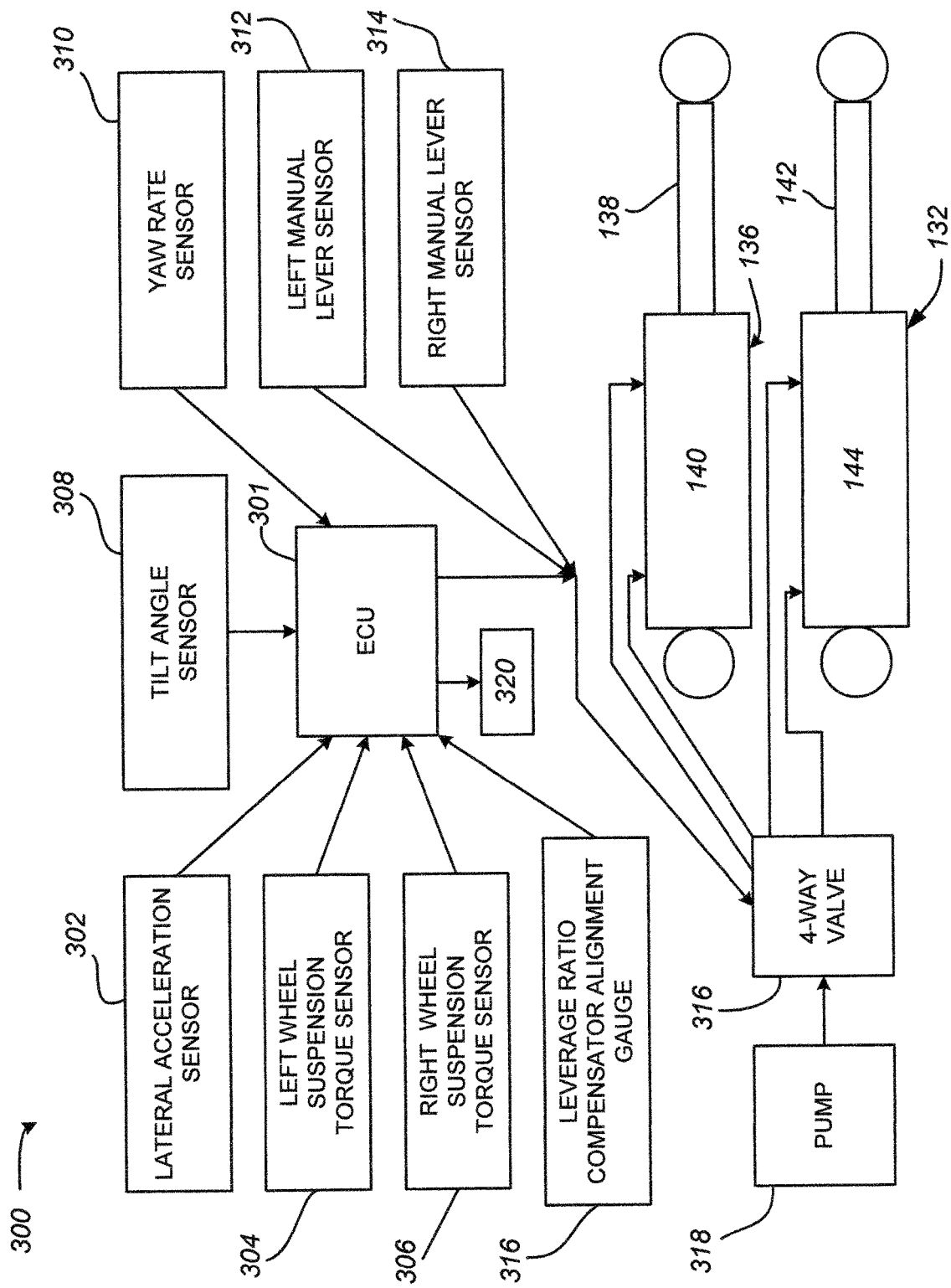
FIG. 11 is a block diagram showing a control system for a vehicle according to this disclosure.

FIG. 11 is a block diagram showing a control system 300 used with the actuation assembly 130 of FIGS. 7 and 8 to control the rotational and lateral movement of the upper chassis relative to the undercarriage of the vehicle. The control system 300 includes an electronic control unit (ECU) that receives input from a plurality of sensors including, but not limited to, a lateral acceleration sensor 302, a left wheel suspension torque sensor 304, a right wheel suspension torque sensor 306, a tilt angle sensor 308, a yaw rate sensor 310, a left manual lever sensor 312, a right manual lever sensor 314, and a leverage ratio compensation gauge 316. Information from the sensors is then processed by the ECU and used to control the operation of a four-way proportional valve 316 which controls the flow of actuating fluid from a hydraulic pump 318 to the left- and right-side hydraulic actuators 132, 136 thereby controlling the movement of the piston rods 138, 142 in and out of the cylinders 140, 144.

When a vehicle according to the present disclosure is parked or stopped, all the ports of the 4-way valve 316 are locked in the closed position to prevent any unintended rotational or lateral movement of the upper chassis that could cause the vehicle to tip over. When the vehicle is in motion, the ECU 301 outputs a signal to unlock and open the ports as needed. The lateral acceleration sensor 302 detects whether the vehicle's combined center of gravity is aligned with the angle of the resultant force and if so, no command is sent to the ECU 301, even if the vehicle is being subjected to high centrifugal forces or is traveling on an off-camber contact surface. However, if the lateral acceleration sensor 302 detects that the vehicle's combined center of gravity is not aligned with the angle of the resultant force, the ECU 301 processes input from the left wheel suspension sensor 304, the right wheel suspension sensor 06, and the tilt angle sensor 308 to calibrate a leverage ratio compensator assembly 320, the operation of which will be explained below in connection with FIGS. 12-14. The ECU 301 can also initiate or limit repositioning of the upper chassis in response to under- or over steering while cornering, as detected by the yaw rate sensor 310.

Left and right manual override sensors 312, 314 allow the driver to command the 4-way proportional valve 316 independently of the ECU 301 when manual tilt angle control is desired such as, for instance when the vehicle becomes airborne over bumps and crests of hills, when turning, or as a back-up in case of ECU failure.

Figure 12:
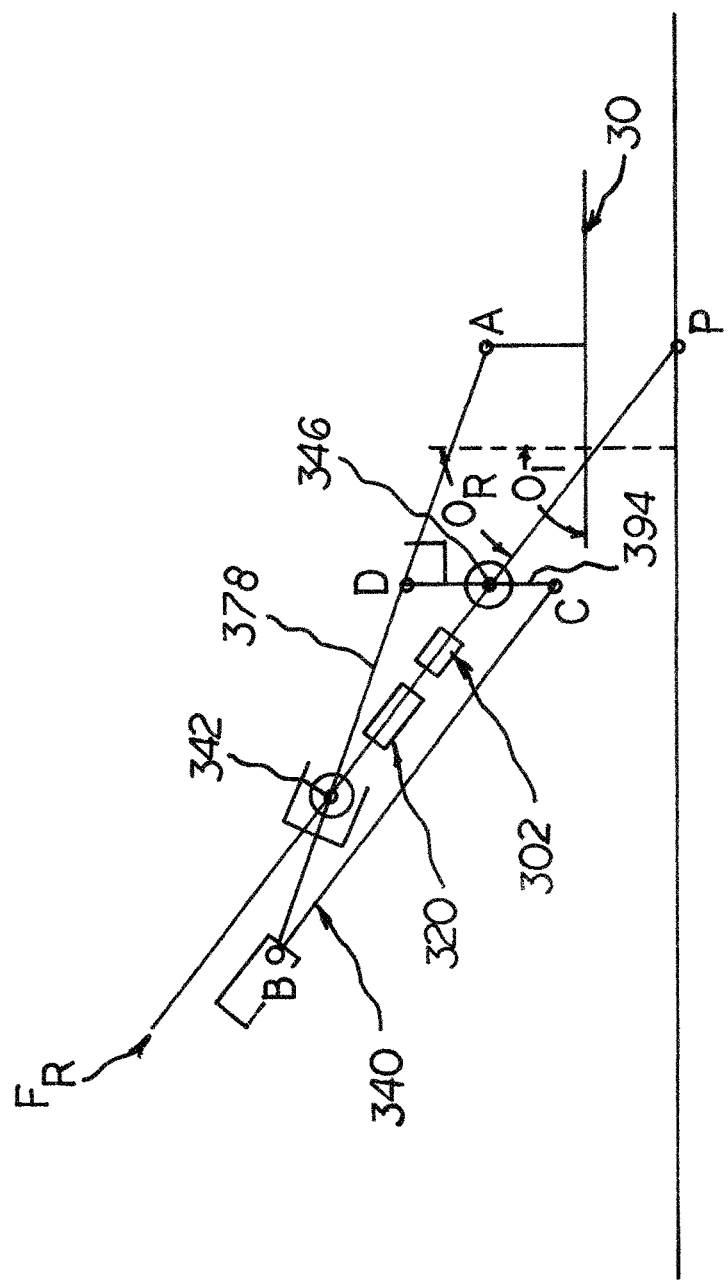
FIG. 12 is a schematic end view showing the placement of a leverage ratio compensator assembly on the chassis of the vehicle of FIGS. 1-4.

As seen in FIG. 12, the leverage compensator assembly comprises a turnbuckle 320 that is coupled at its upper end to the swing bar 378 at an upper turnbuckle pivot point 342 located between the sliding pin 386 (pin longitudinal axis A). At its lower end, the turnbuckle 320 is coupled to the crank arm 94 at a lower turnbuckle pivot point 346 located between the mobile longitudinal axis C and the crank axis D. When the ratio between the weight of the upper chassis and the weight of the undercarriage equals the desired offset ratio (ie. 3:1 in the embodiment of FIGS. 1-4), the turnbuckle 320 is aligned with the resultant force vector $F_R$ and parallel to the rear post 40 of the upper chassis (ie. $\theta_1 = \theta_R$), as shown. If the ratio is greater than desired, the upper chassis lean angle $\theta_1$ will be less than the angle $\theta_R$ of the resultant force vector $F_R$. Conversely, if the ratio is less than desired, the lean angle $\theta_1$ of the rear post 40 will be greater than the angle $\theta_R$ of the resultant Force $F_R$.

Figures 13, 14:
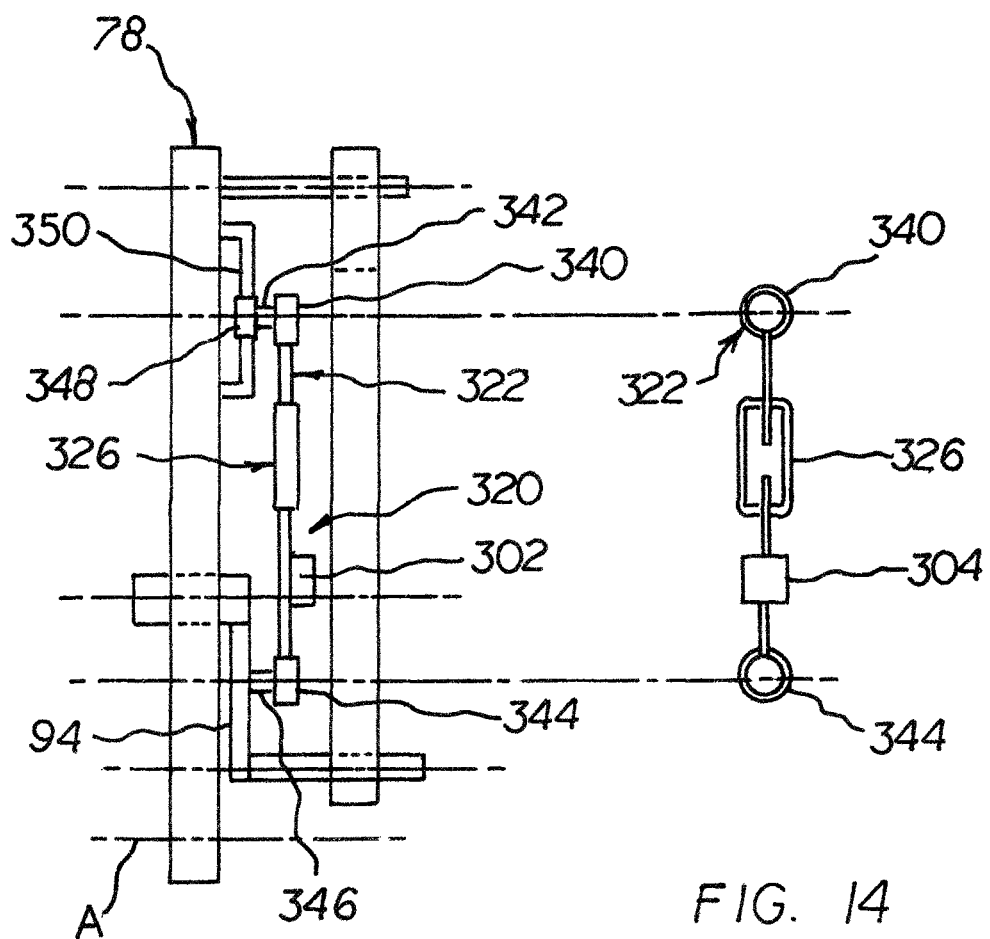
FIG. 13 is a schematic side view of the leverage ratio compensator assembly of FIG. 12.
FIG. 14 is a schematic end view of the leverage ratio compensator assembly of FIG. 13.

As seen in more detail in FIGS. 13 and 14, the turnbuckle 320 includes an upper eyebolt 322 screwed into the upper end of a turnbuckle frame 326 and a lower eyebolt 328 screwed into the lower end of the turnbuckle frame 326. The annular upper end 340 of the upper eyebolt 322 is rotatably coupled to an upper pivot pin 342, and the annular lower end 344 of the lower eyebolt 328 is rotatably coupled to a lower pivot pin 346. The lower pivot pin 346 is fixed to the center of the crank arm 94, and the upper pivot pin 342 is fixed to a slide tube 348 that is slidable along a vertical post 350 coupled to the rear swing arm 78 of the cradle. A lateral acceleration sensor 302 may be attached to the shank of either the upper or the lower eyebolt, 322, 328.

If the lateral acceleration sensor 302 detects that leverage ratio compensator assembly 320 is not aligned with the angle of the resultant force $F_R$, the ECU sends a signal to the leverage ratio compensator alignment gauge, which produces visual indication that the offset must be adjusted. The correct offset can be achieved by manually rotating the turnbuckle frame 326 to increase or decrease the distance between the upper and lower pivot pins 342, 346. This will create a torque causing the crank arm 94 to rotate in a clockwise or counterclockwise direction until the leverage ratio compensator assembly 320 is properly adjusted. In alternate embodiments, the distance between the upper and lower pivot pins 342, 346 could be adjusted by pneumatic, hydro-pneumatic, electrical, or mechanical actuators rather than manually, without deviating from the scope of the disclosure.

Figure 15:
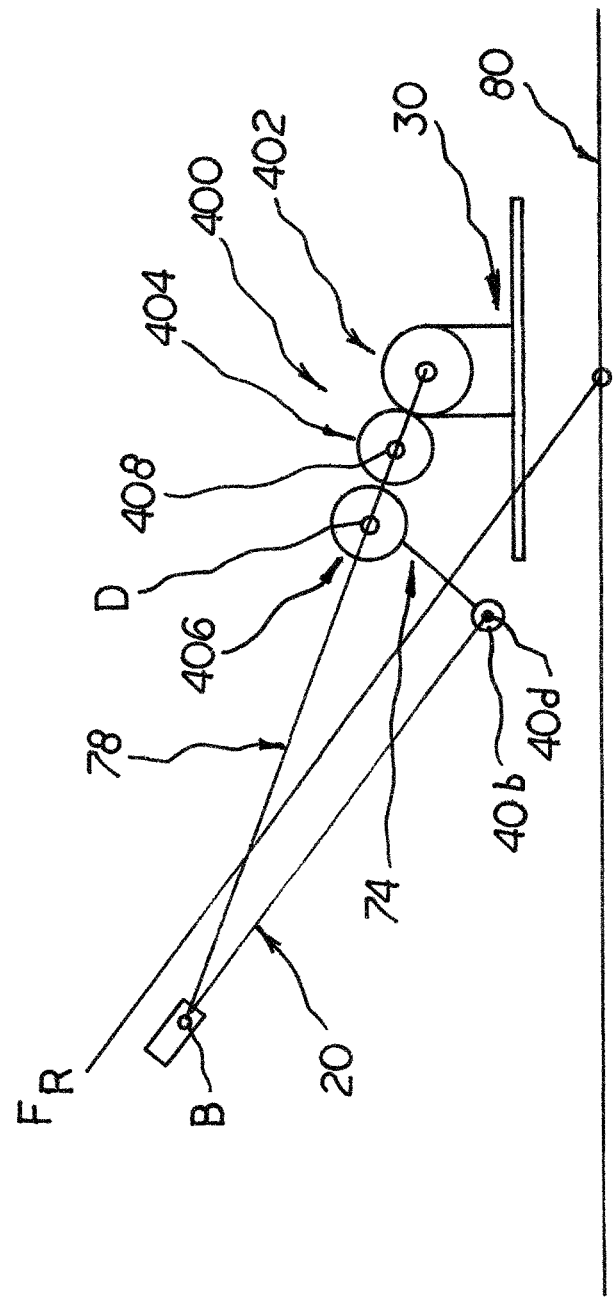
FIG. 15 is a schematic end view showing an alternate embodiment of a vehicle in which the parallelogram linkage has been replaced by a set of gears.

FIG. 15 is a schematic end view of a vehicle similar to the embodiment of FIGS. 1-4, but where the parallelogram linkage 102 has been replaced by a gear mechanism 400 including a stationary gear 402, an idler gear 404, and a crank arm gear 406. The stationary gear 402 is attached to the undercarriage 30 of the vehicle and is centered on the main longitudinal axis A. It meshes with the idler gear 404, which is pivotally connected to the rear swing arm 78 and rotatable about idler gear axis 408. The idler gear 404 meshes with the crank arm gear 406, which rotates about the crank axis D. The gear ratios are selected such that, when the rear swing arm 78 tilts, it causes the idler gear 404 to move up or down the stationary gear 402 and to rotate the crank arm gear 406, causing the bottom end of the crank arm (and with it, the mobile longitudinal axis C and the bottom end of the rear swing arm 78) to translate laterally.

Figure 16:
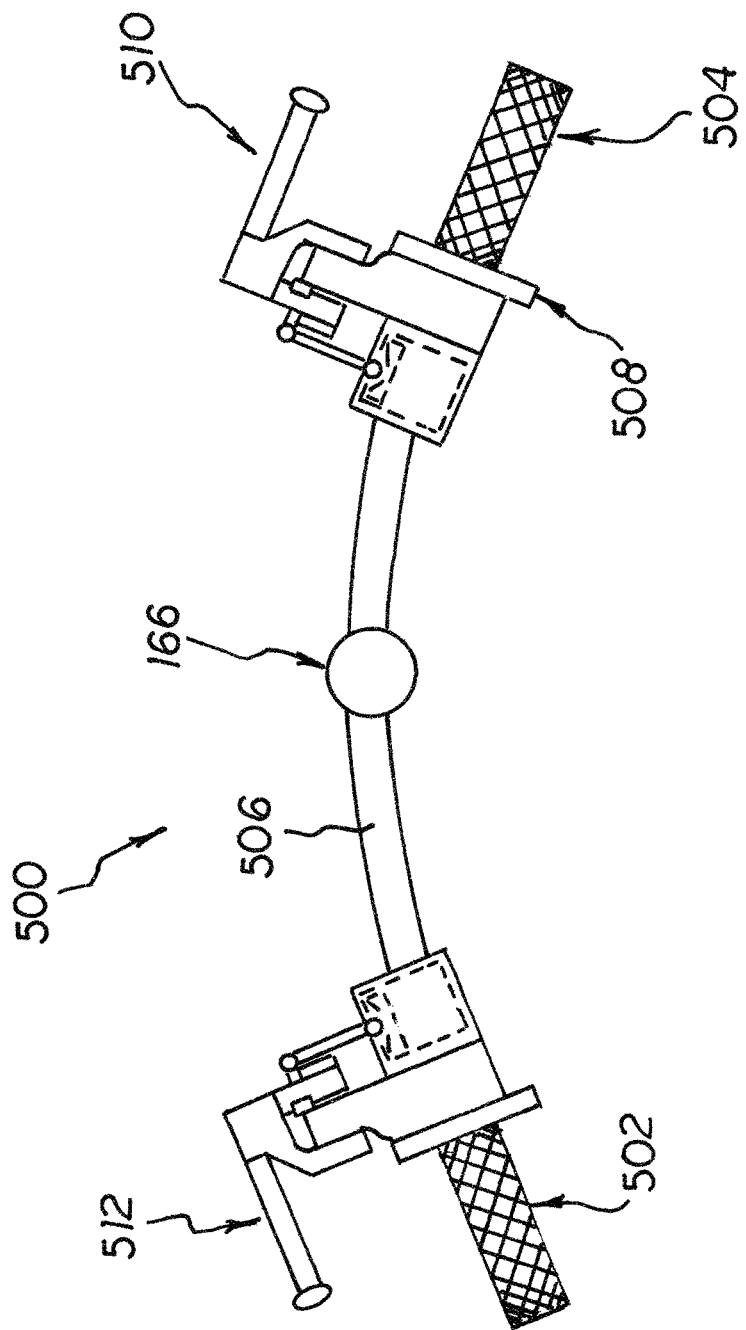
FIG. 16 is a top view showing a set of handle bars usable with the steering arrangement of FIG. 9.

FIG. 16 is a top end view showing a pair of handle bars 500 that may be substituted for the steering wheel in the steering arrangement of FIG. 9. The handle bars 500 include a left hand grip 502 and a right hand grip 504 which are connected to the opposite ends of a steering bar 506 that is centrally connected to and extends perpendicular to the rear end of the steering input shaft 166. The right hand grip 504 is rotatably connected to a motorcycle-type throttle 508 (cable or potentiometer). A right hand lever control assembly 510 is mounted on the steering bar 506 just inwardly of the throttle 508, and a left hand lever control assembly 512 is mounted on the steering bar just inwardly of the left hand grip.

Figure 17:
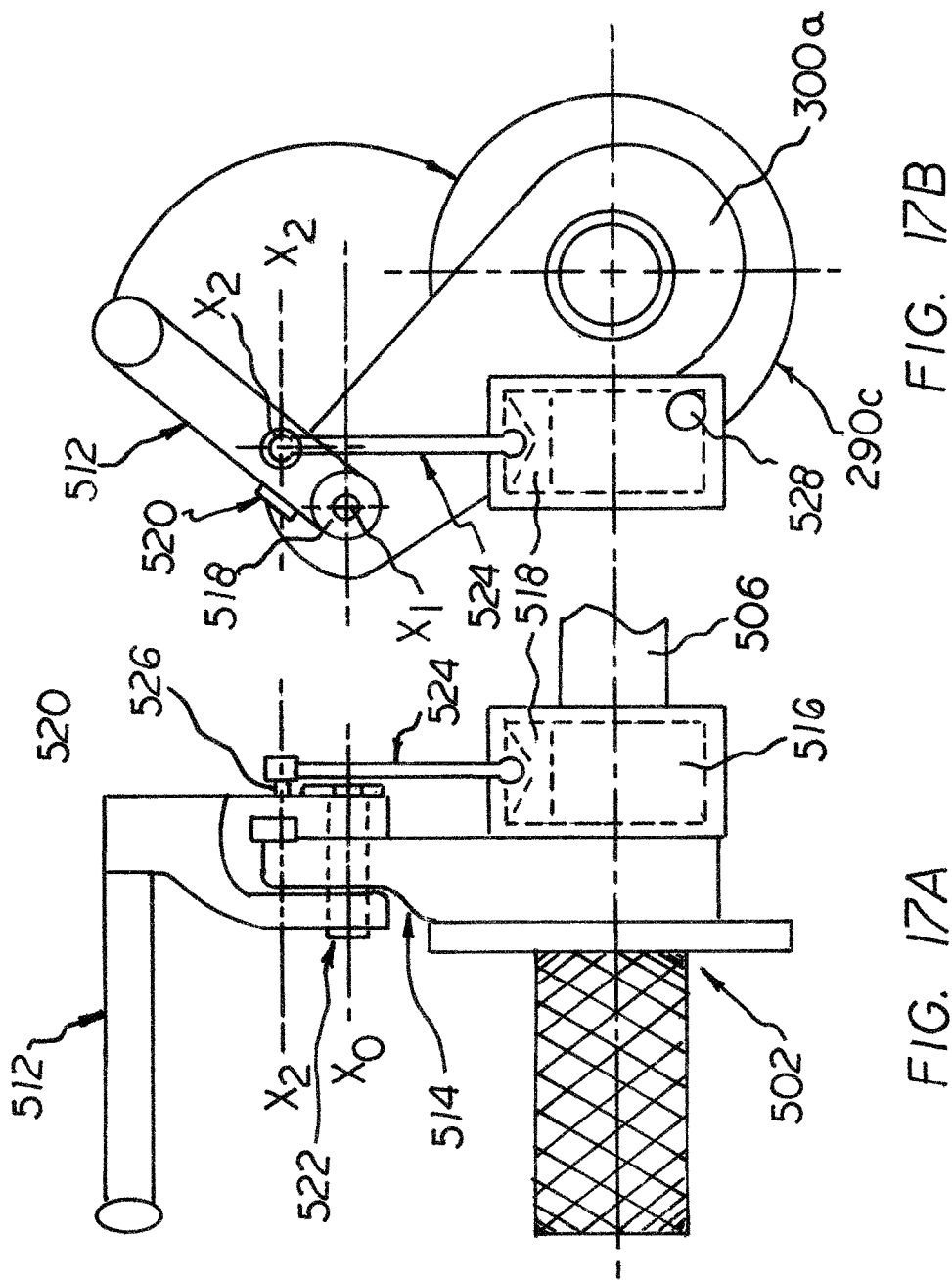
FIG. 17A is a detailed top view of one of the hand grips of FIG. 16.
FIG. 17B is an end view of the hand grip of FIG. 17A

FIGS. 17A and 17B show the left hand lever control assembly 512, which is a mirror image of the right hand lever control assembly. The assembly comprises a lever perch 514 that is securely clamped to the steering bar 506 between the hand grip 502 and the hydraulic master cylinder 516 that extends perpendicular to the steering bar 506. A hole having a longitudinal axis X, parallel to the steering bar 506 extends through the top portion of the lever perch 514 and receives a lever pivot pin 518 that pivotably secures the hand lever 512 to the lever perch 514. An angle stop 520 prevents the hand lever 512 from pivoting too far forwardly relative to the lever perch 514.

A piston cup 519 is slidable within, and sealingly engages the walls of, the bore of the master cylinder 516. The piston cup 522 is coupled to a vertically extending push rod 524 having an upper end that is pivotally secured to a push rod pivot pin 526 having a longitudinal axis $X_2$. As can be seen in the side view of FIGS. 17A and 17B, rotation of the hand lever 512 about the longitudinal axis $X_2$ causes the push rod 524 to press the piston cup 519 into the bore of the master cylinder 516, which forces hydraulic fluid contained in the bore to exit through a port 528 at or near the bottom of the cylinder 516, and subsequently to actuate a slave cylinder and to control a clutch, brakes, or other manually operated device on the vehicle. The configuration of the hand lever 512 allows a more natural squeezing motion than conventional hand levers, and distributes forces evenly across all the user's fingers, making it more effective and more comfortably to use than currently available "clam shell" type levers, which concentrate all the forces on the weakest finger. One skilled in the art would recognize however, that other types of actuators besides the illustrated hydraulic actuator may be employed without departing from the principles of the disclosure.

Figure 18:
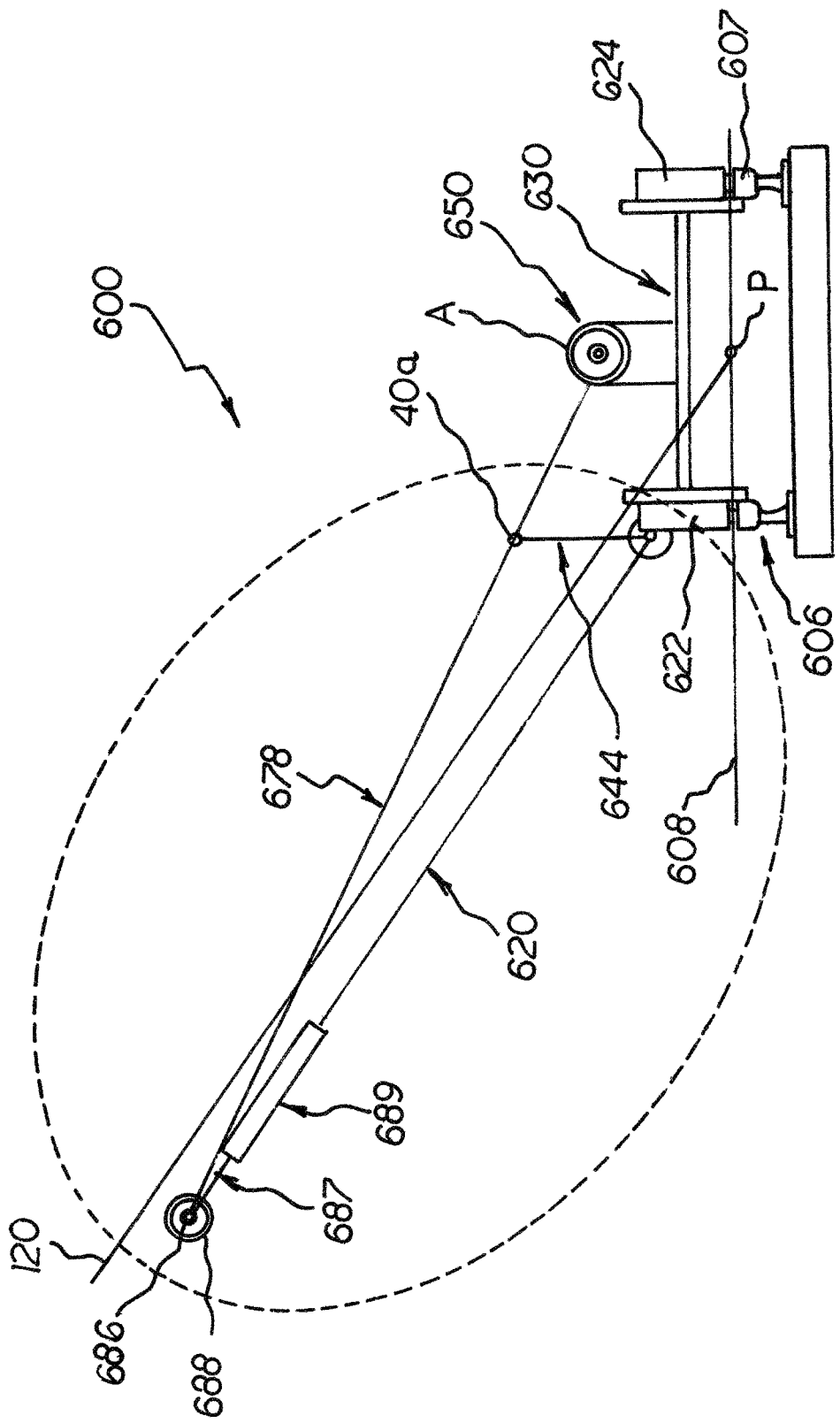
FIG. 18 is a diagrammatic end view showing an embodiment of the vehicle of the present disclosure, adapted for use as a railroad car.

FIG. 18 is a diagrammatic end view showing the principles of the disclosure adapted for use on a railway car 600, where the contact surface 608 is defined by the tops of the tracks 606, 607, rather than by the ground. As in the vehicle of the previous embodiments, the railway car 600 includes a cradle comprising a swing arm 678 that extends upwardly from a tubular base member 650 that is pivotable about a main longitudinal axis A parallel to an undercarriage 630. The upper chassis 620 has an upper end that is secured to the top of the swing arm 678 by a vertically slidable pivot pin 686, and a lower end that is pivotably secured to the lower end of a crank arm 694 that allows the chassis 620 to translate laterally as well as to pivot relative to the cradle/swing arm 650. The basic relationships between the undercarriage 630, the cradle 650 and the upper chassis 620 are the same as in the previous embodiments, except that the undercarriage center of gravity may be closer to the point of contact P between the wheels 622, 624 and the tracks 606, 607. A lower center of gravity requires less lateral offset of the upper chassis center of gravity, which allows for a taller swing arm 678, and a smaller tilt angle between the swing arm 678 and the undercarriage 630. Also, the sliding pin/vertical slot connection shown in the embodiment of FIGS. 1-4 has been replaced with a telescopic tubular slide connection that includes a rod 687 having its bottom end telescopically received in a tube at the top of the upper chassis 620 and its upper end pivotally coupled to the pivot pin 686 by a rod eye 688.

FIG. 19 is a diagrammatic end view of a railway car 700 similar to the embodiment of FIG. 16, having an upper chassis 720 that is three seats wide.

FIG. 20 is a diagrammatic end view of a railway car 800 similar to the embodiment of FIG. 16, having a double upper chassis 820 that is four seats wide.

Figure 21:
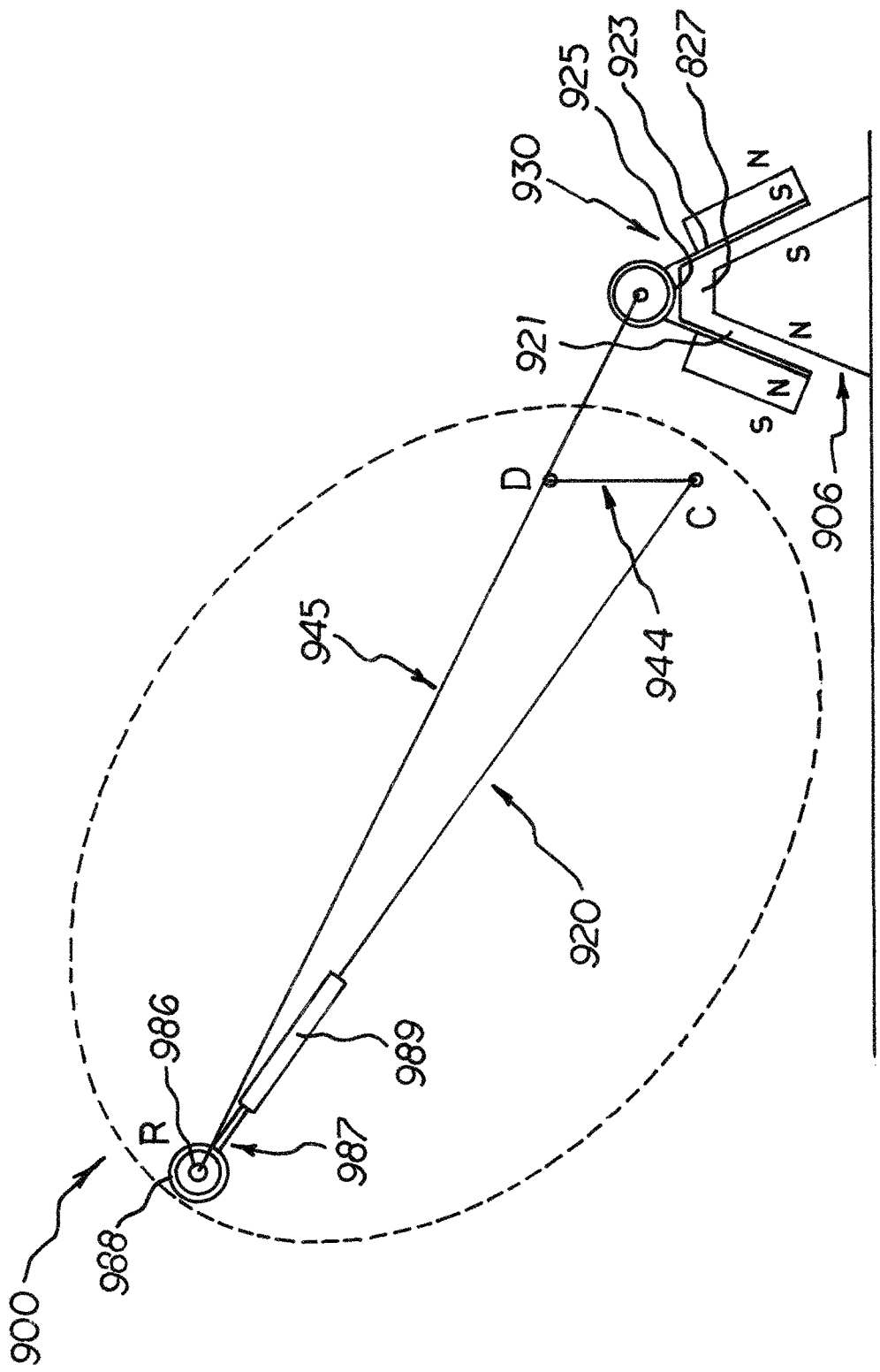
FIG. 21 a schematic end view showing an embodiment of the vehicle of the present disclosure, adapted for use on a magnetic levitation contact surface.

FIG. 21 is a schematic end view showing the principles of the disclosure adapted for use on maglev vehicle 900. The basic structure of the cradle 945 and upper chassis 920 is the same as in the embodiment of FIG. 18, but the wheeled undercarriage has been replaced with an electromagnetic undercarriage 930 including first and second electromagnetic side walls 921, 923 that extend downwardly and outwardly from a horizontal upper platform 925 to define an inverted V-shaped channel configured to travel over a truncated triangle-shaped electromagnetic contact surface 906. The north side of the first electromagnetic side wall 921 faces the north side of the contact surface 906, and the south side of the second electromagnetic flange 923 faces the south side of the contact surface 806, thus creating opposing forces that levitate the vehicle 900 above the contact surface 906. As in the embodiment of FIG. 16, the undercarriage center of gravity may be lower than in the vehicle of FIGS. 1-4, thus allowing a taller swing arm 978 and a smaller tilt angle between the swing arm 978 and the undercarriage 930.

Figure 22:
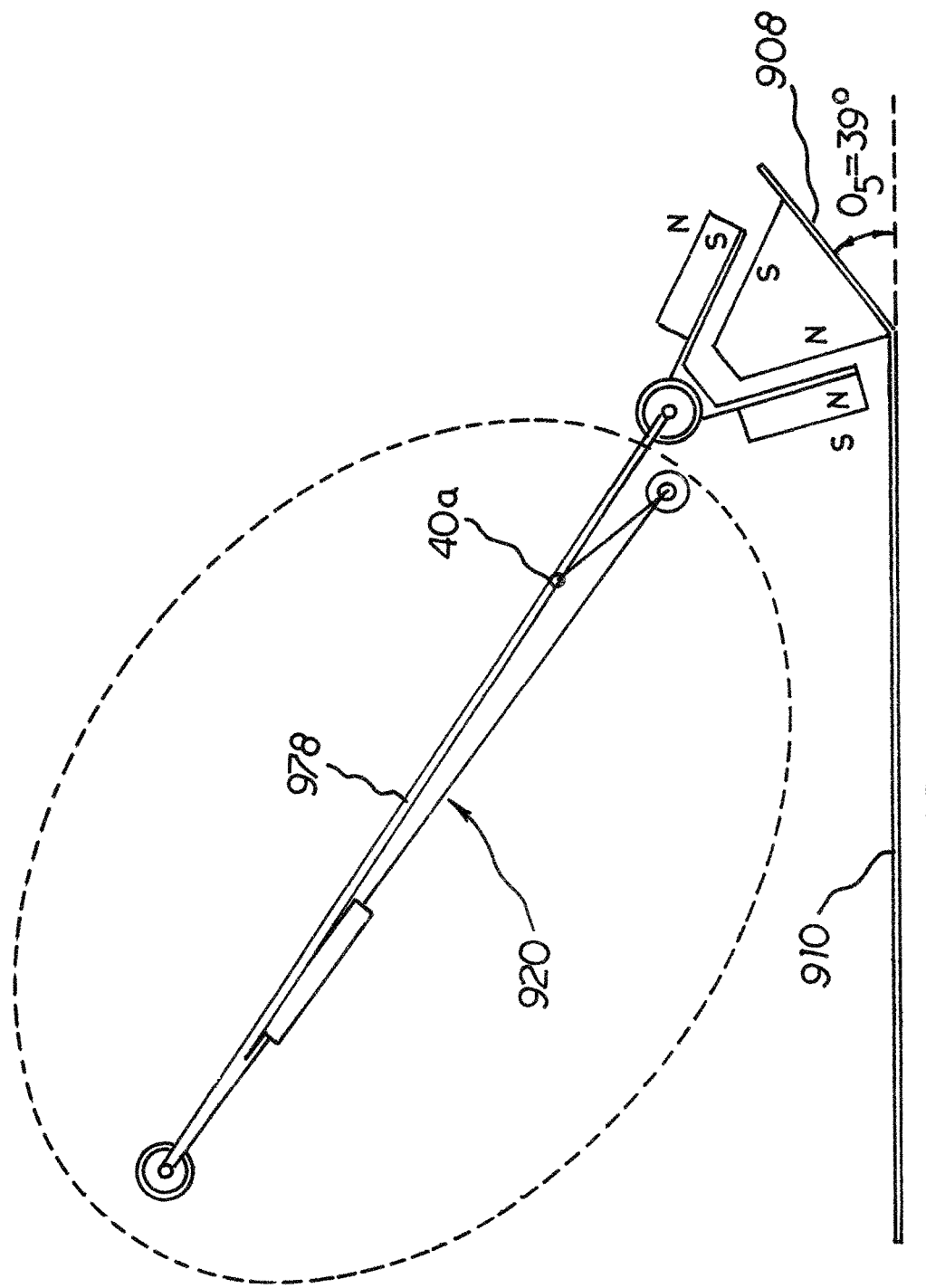
FIG. 22 is a schematic end view showing the vehicle of FIG. 21 on a canted contact surface.

FIG. 22 is a schematic end view showing the maglev vehicle 900 of FIG. 19 traveling along a contact surface 908 that is canted by an angle $\theta_s$ relative to level ground 910, where $\Theta_s=39°$, and where the chassis 920 is pivoted a minimum distance out of alignment with the swing arm 978.

Figure 23:
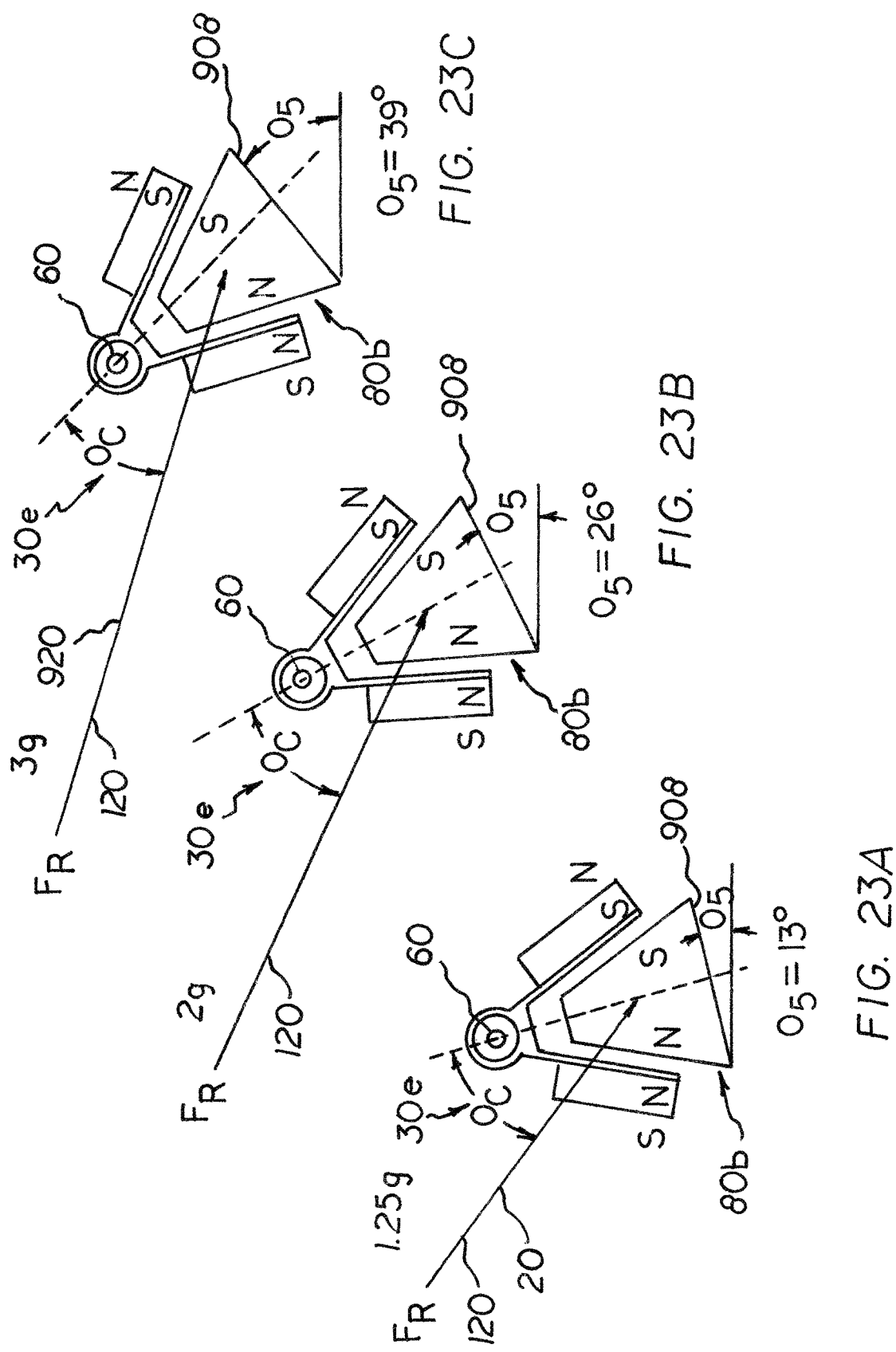
FIG. 23A is a schematic end view showing the lean angle of the upper chassis at a first cant angle of the contact surface.
FIG. 23B is a schematic end view showing the lean angle of the upper chassis at a second cant angle of the contact surface.
FIG. 23C is a schematic end view showing the lean angle of the upper chassis at a third cant angle of the contact surface.

FIGS. 23A, B, and C show the relationship between the lean angle $\theta_C$ of the chassis 920 and the cant angle $\theta_s$ of the contact surface 908. Specifically, they show that as the cant angle $\theta_s$ increases from 13° in FIG. 21A to 26° in FIG. 21B and 39° in FIG. 21C, the possible lean angle $\theta_C$ also increases. As the lean angle $\theta_C$ increases, so do the angle and the magnitude of the resultant force $F_R$ exerted by the vehicle's combined center of gravity on the contact point P. Specifically, the magnitude of the resultant force increases from 1.25 g at $\theta_C$=13° to 2 g at $\theta_C$=26° and 3 g at $\theta_C$=39°. For a vehicle having the same parameters as the vehicle in FIGS. 1-4 (ie. maximum lean angle of 52°; offset ratio of 3:1, etc.), the resultant force would increase to over 4 g, meaning that the vehicle would remain stable at a higher speed than comparable vehicles traveling along a surface with the same cant.

FIG. 24 is a schematic end view showing an alternate maglev support arrangement including an undercarriage 1030 and contact surface 1006. The contact surface 1006 includes a V-shaped channel 1005 having a first sloped wall 1007 and a second sloped wall 1008. The undercarriage 1030 has a central portion 1009 shaped as an inverted pyramid supporting a central wheel or wheels 1005. The central portion 1009 has a first side 1010 facing the first sloped wall 1007 of the contact surface 1006 and a second side 1012 facing the second sloped wall 1008. The upper end of the first side 1010 of the central portion 1009 is coupled to a first upper extension 1014 coupled to a first outer wall 1016 that extends parallel to the first side 1010. The upper end of the second side 1012 of the central portion 1009 is coupled to a second upper extension 1018 coupled to a second outer wall 1020 that extends parallel to the second side 1014. The first side 1010 of the central portion 1009, the first upper extension 1014, and the first outer wall 1016 together form a first rectangular channel 1022, and the second side 1012 of the central portion 1009, the second upper extension 1018, and the second outer wall 1020 together form a second rectangular channel 1024.

The central portion 1009 of the undercarriage 1030 comprises a first electromagnet having its south pole in the first side 1010 and its north pole in the second side 1012. The first sloped wall 1007 of the contact surface 1006 comprises a second electromagnet having its south side facing inwardly and its north side facing outwardly. The second sloped wall 1008 of the contact surface 1006 comprises a third electromagnet having its north side facing inwardly and its south side facing outwardly. The first outer wall 10016 of the undercarriage 1030 comprises a fourth electromagnet having its south side facing inwardly and its north face facing outwardly, and the second outer wall 1020 of the undercarriage 1030 comprises a fifth electromagnet having its north side facing inwardly and its south side facing outwardly. When the undercarriage 1030 is positioned above the contact surface 1006, its central portion 1009 is received in the V-shaped channel 105, and the two sloped walls 1007, 1008 of the contact surface 1006 are received in the first and second rectangular channels 1022, 1024. When all the electromagnets are energized, the opposing forces between the sloped walls 1007, 1008 of the contact surface 1006 and the corresponding sides 1010, 1012 of the central portion 1009 of the undercarriage 1030 cause the vehicle to levitate above the contact surface. However, when the electromagnets are deenergized, the vehicle is supported by its wheel or wheels 1032 which rest(s) securely between the sloped walls 1007 of the V-shaped channel 1005.

FIG. 25 shows an alternate maglev support arrangement which is an inverted version of the arrangement of FIG. 22. That is, the undercarriage 1130 defines a V-shaped channel 1105 that receives the truncated pyramid-shaped central portion 1109 of the contact surface 1106, and the contact surface 1106 defines two rectangular channels 1122, 1124 that receive the sloped sidewalls 1107, 1108 of the V-shaped channel 1105.

FIG. 26 shows a maglev support arrangement similar to the arrangement shown in FIG. 19, where the truncated pyramid-shaped portion of the contact surface 1206 has been elevated above the ground 1200 by a riser 1201, and the side walls 1221, 1223 of the undercarriage 1230 have been provided with inwardly extending flanges 1230, 1232 that are retained in the space between the bottom of the contact surface 1206 and the ground 1200. In addition, the arrangement includes wheels 1222, 1224 that are connected to the outer sides of the side walls 1221, 1223. This arrangement may also be used in a monorail embodiment in which the electromagnets are eliminated and the wheels 1222, 1224 are propelled by a motor.

Figure 27:
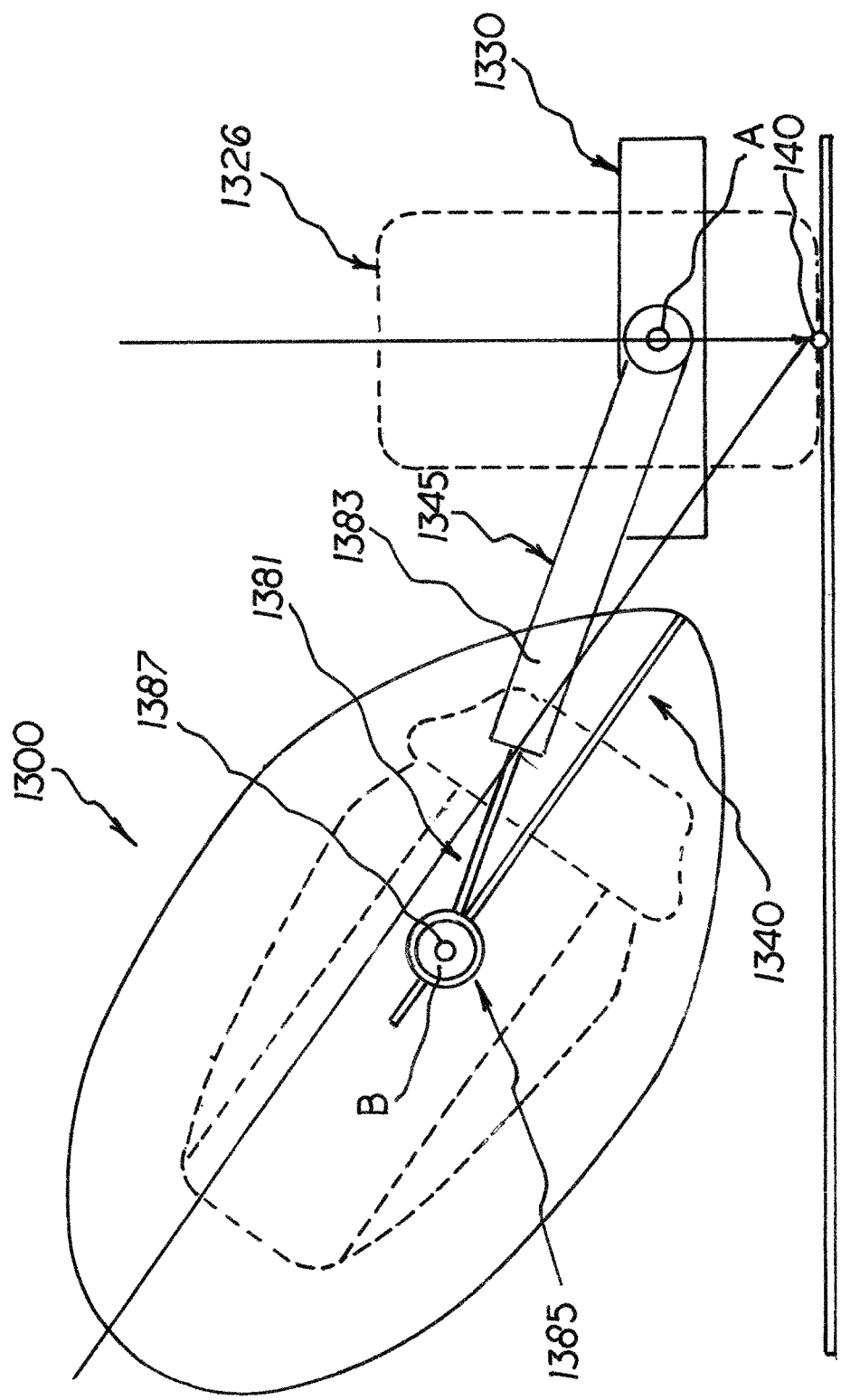
FIG. 27 is a schematic end view of an alternate embodiment of a vehicle according to the present disclosure.

FIG. 27 is a schematic end view of an alternate embodiment of the disclosure, wherein the vehicle 1300 has in-line wheels 1326 and wherein the cradle 1345 includes an upper rod 1381 telescopically received in a lower tubular member 1383. The bottom of the lower tubular member 1383 is pivotably secured to the undercarriage 1330 at a pivot point along the main longitudinal axis A, which is lower than in the embodiment of FIGS. 1-4. The top of the upper rod 1381 includes a rod eye 1385 that receives a pivot pin 1387 defining the mobile longitudinal axis B, which is higher than in the embodiment of FIGS. 1-4. One skilled in the art will recognize that movement of the upper rod 1381 in and out of the bottom tube and rotation of the chassis 1340 about the mobile longitudinal axis B can be effected in various ways, including but not limited to mechanical semi-ring gears secured to the undercarriage 1330 and the upper chassis 1340, or by pneumatic, hydraulic, hydro-pneumatic, electrical or mechanical linear or rotary actuators, without deviating from the scope of the disclosure.

Figure 28:
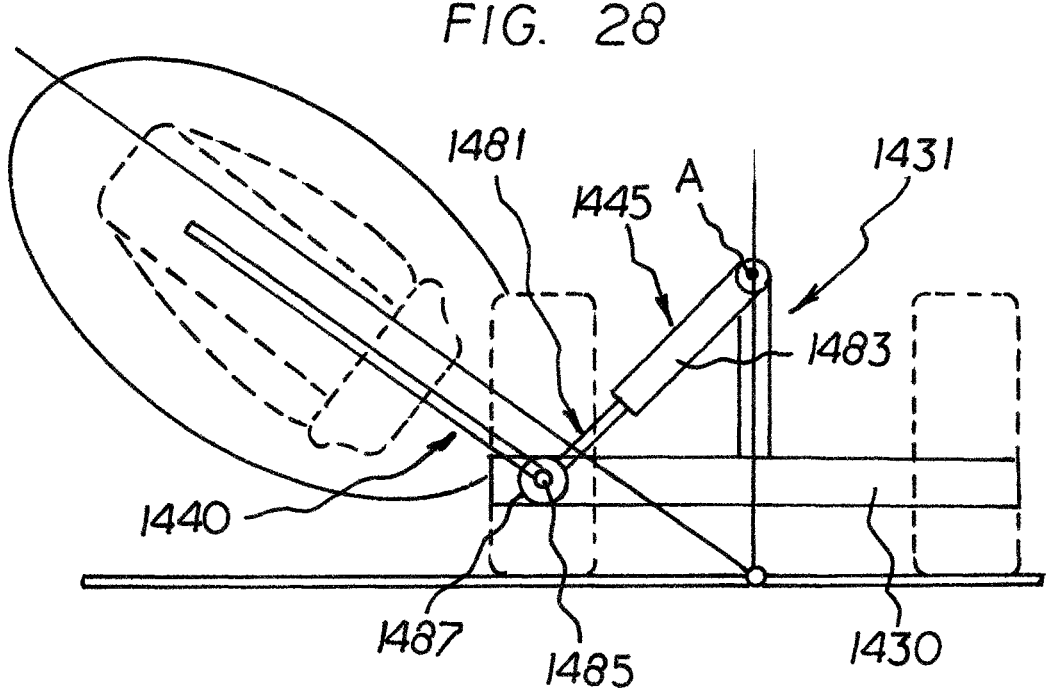
FIG. 28 is a schematic end view of another alternate embodiment of a vehicle according to the present disclosure.

FIG. 28 is a schematic end view of another embodiment of the disclosure, wherein the cradle 1445 includes a lower rod 1481 telescopically received in an upper tubular member 1483. The top of the upper tubular member 1483 is pivotably secured to a pillar 1431 projecting upwardly from the base undercarriage 1430 at the main longitudinal axis A, which is higher than in the previous embodiments. The bottom of the lower rod 1481 includes a rod eye 1485 that receives a pivot pin 1487 projecting from the lower end of the upper chassis 1440 and defining the mobile longitudinal axis B, which in this embodiment is located below the main longitudinal axis A. Movement of the upper chassis 1440 relative to the undercarriage 1430 may be effected in various ways. For instance, the swing arm 1478 may be pivotably connected to the undercarriage pillar 1431 and the upper chassis 1340 by rotary actuators, and the upper tubular member 1483 and lower rod 1481 may be components of a hydraulic cylinder. One skilled in the art will recognize that other types of actuators including pneumatic, hydraulic, hydro-pneumatic, electrical or mechanical linear or rotary actuators may also be used, without deviating from the scope of the disclosure.

Figure 29:
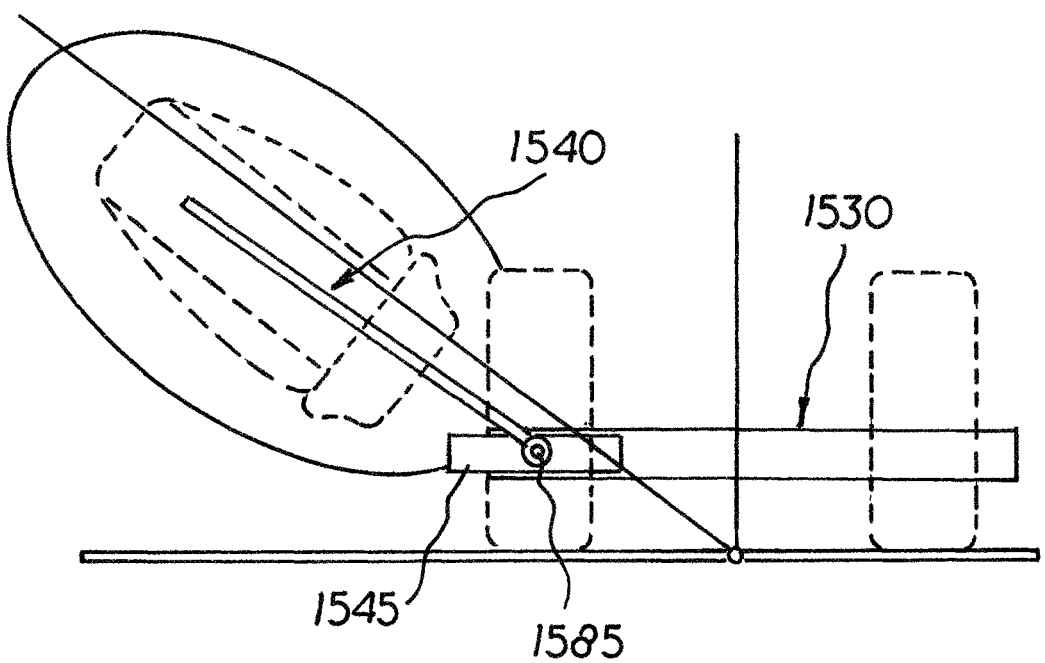
FIG. 29 is a schematic end view of still another embodiment of a vehicle according to the present disclosure.

FIG. 29 is a schematic end view of still another embodiment of the disclosure, wherein the lower end of the upper chassis 1540 is coupled to and rotatable about a pin 1585 projecting from a slide 1545 that is mounted for lateral movement along the undercarriage 1530. The pin 1585 defines the mobile longitudinal axis B. Although the slide 1345 is shown here to move in a straight path along a straight undercarriage 1530, the path or the undercarriage or both may also be curved or arcuate, as long as the overall direction is lateral. Various means may be used for effecting rotational and lateral movement of the upper chassis 1540, as well as lateral movement of the slide 1545. For instance, movement of the upper chassis 1540 may accomplished by a rotary actuator coupled to the upper chassis 1530 and the slide 1545, while movement of the slide 1545 may be accomplished by a linear actuator coupled to the slide 1545 and the undercarriage 1530. One skilled in the art will recognize that other types of actuators including pneumatic, hydraulic, hydro-pneumatic, electrical or mechanical linear or rotary actuators may also be used, without deviating from the scope of the disclosure.

Figure 30:
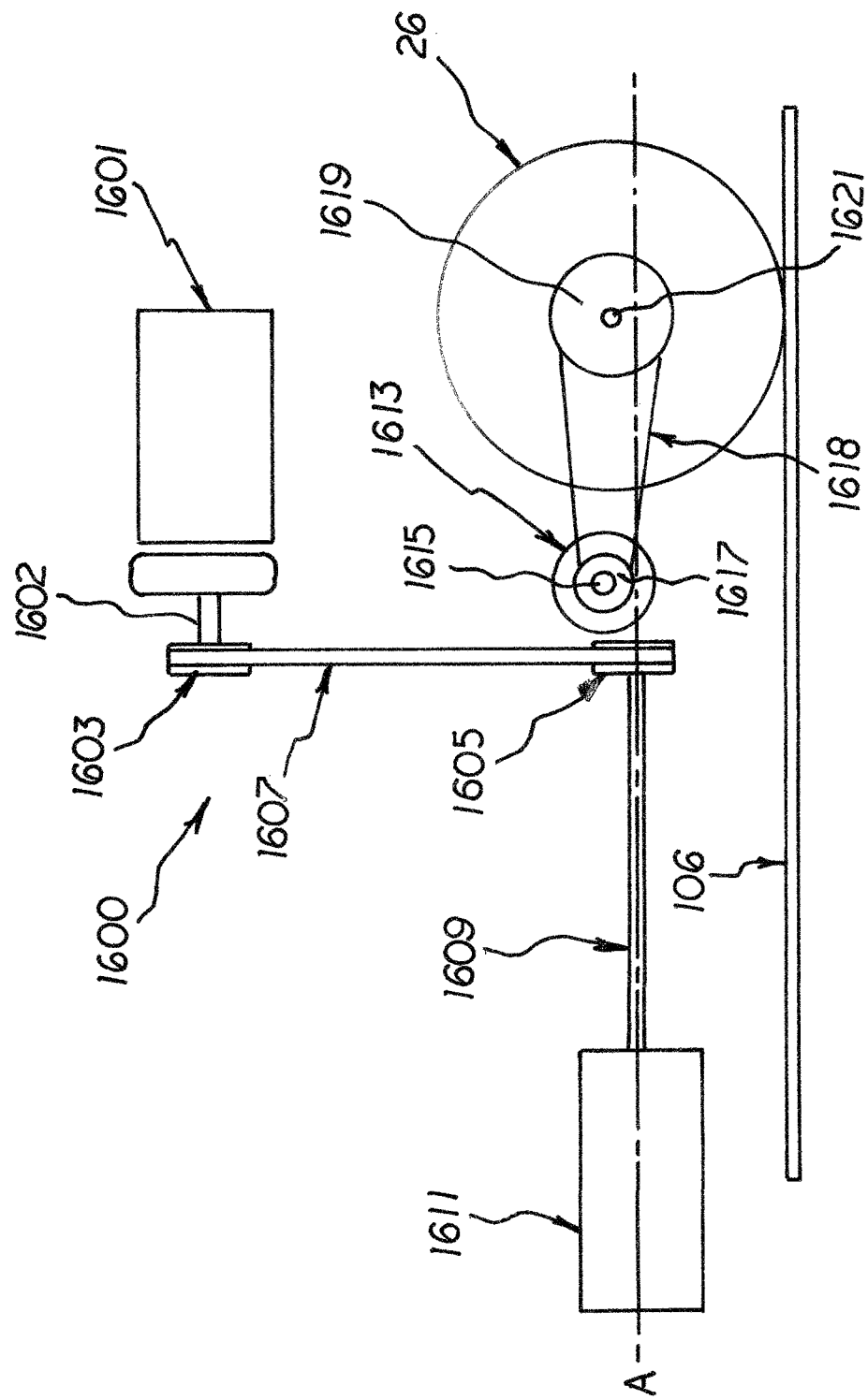
FIG. 30 is a schematic side view of one embodiment of a hybrid power train usable with a vehicle according to the present disclosure.

FIG. 30 is a schematic side view showing one embodiment of a hybrid power train 1600 that may be used with the vehicle shown in FIGS. 1-4. The power train 1600 includes an internal combustion engine 1601 that is located above the rear wheel and coupled to the swing arm of the vehicle. The engine 1601 includes an output shaft 1602 that extends in the direction of an electric motor 1611 and rotates a first toothed pulley 1603 that is coupled to a second toothed pulley 1605 by a first drive belt 1607. The second pulley 1605 is mounted on the drive shaft 1609 of the electric motor 1611. The drive shaft 1609, which coincides with the main longitudinal axis A of the vehicle, extends through the second pulley 1605 and supports a transaxle 1613 that rotates an output shaft 1615 supporting a third toothed pulley 1617. A second drive belt 1618 couples the third toothed pulley 1617 to a fourth toothed pulley 1619 which rotates about the rear wheel axle 1621 and is connected to the rear wheel 26. One skilled in the art will recognize that the transaxle 1613 could be driven by the electric motor 1611 rather than the engine 1601, and that some of the power components may be eliminated or substituted, or more components added, or that other devices for transmitting power including, but not limited to sprockets, chain and gears, shafts, and universal and/or constant velocity joints, may be used without deviating from the scope of the disclosure.

Figure 31:
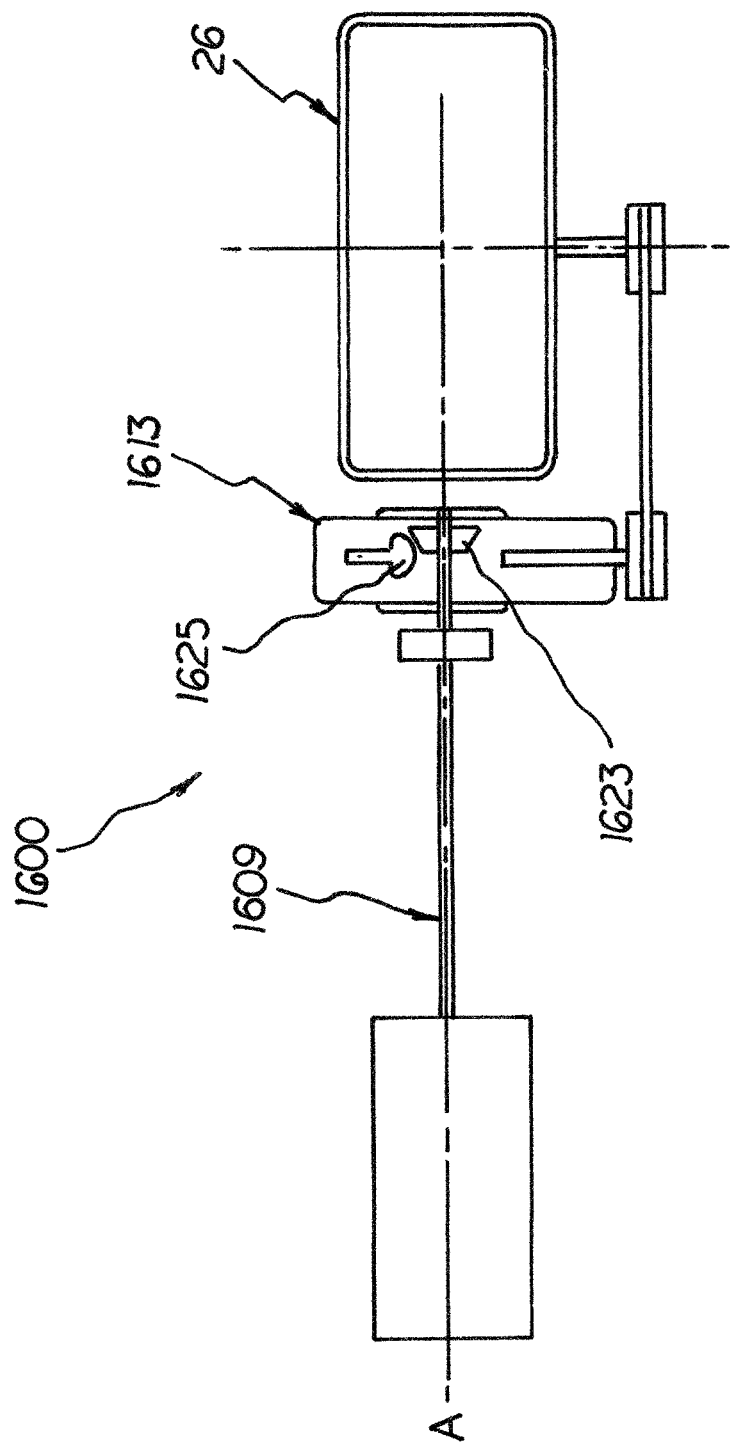
FIG. 31 is a top view of the power train of FIG. 30.

FIG. 31 is a top view of the power train 1600 of FIG. 29, with overlying components such as the clutch, primary output shaft, output toothed pulley and upper drive belt removed to provide a better view of the transaxle 1613, which includes a ring gear 1623 carried on the drive shaft 1609, and pinion gear 1625 that meshes with the ring gear 1623 and rotates about a longitudinal axis perpendicular to the main longitudinal axis A.

Figure 32:
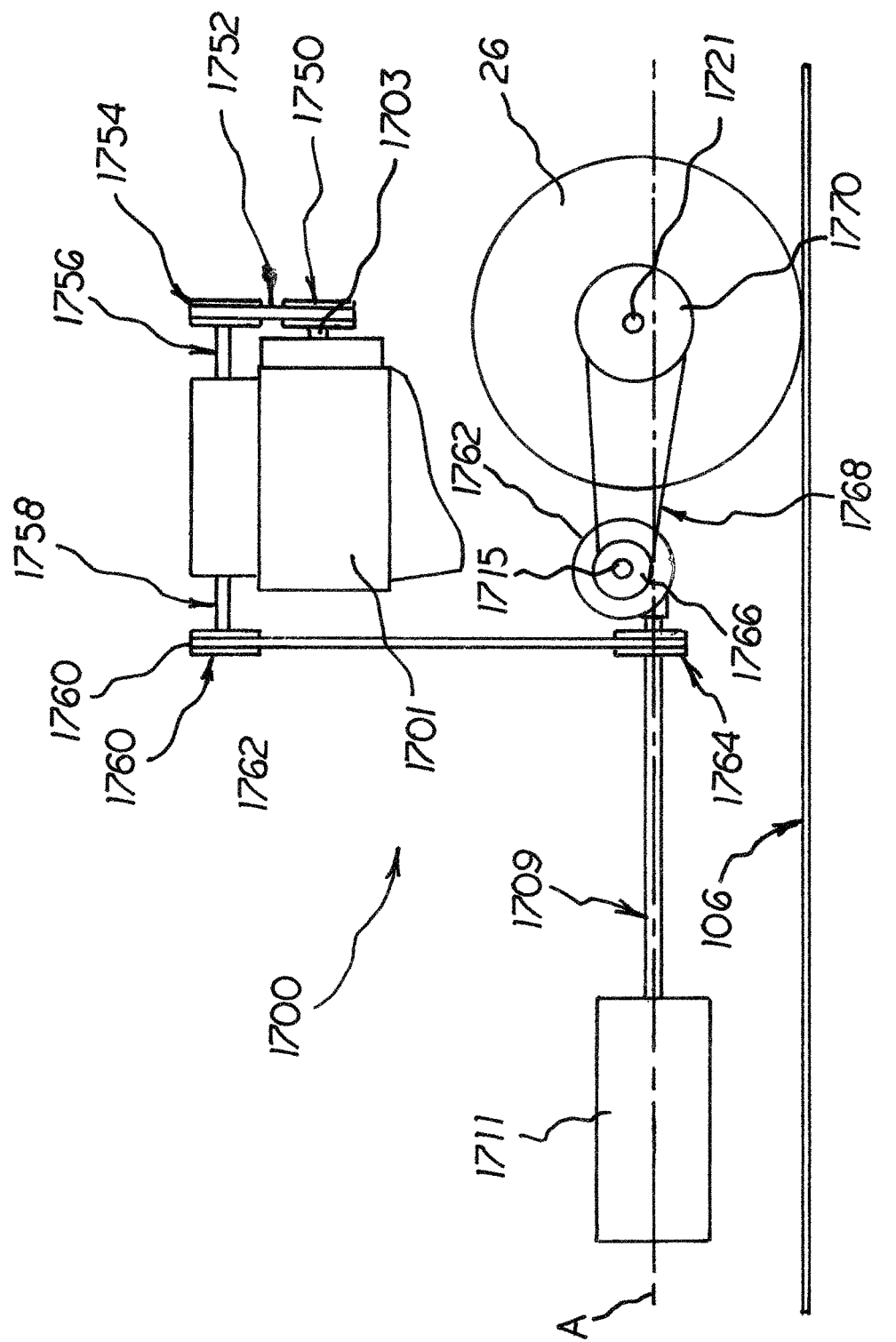
FIG. 32 is a schematic side view of another embodiment of a hybrid power train usable with a vehicle according to the present disclosure.

FIG. 32 is a schematic side view of a hybrid power train 1700 according to an alternate embodiment of the disclosure. The internal combustion engine 1701 in this embodiment has an output shaft 1703 that extends in a direction away from the electric motor 1711 and supports a first toothed pulley 1750. A first drive belt 1752 connects the first toothed pulley 1750 to a second toothed pulley 1754 that is carried by a transmission input shaft 1756 connected by a set of transmission gears to a transmission output shaft 1758. The transmission output shaft 1758 supports a third toothed pulley 1760. A second drive belt 1762 connects the third toothed pulley 1760 to a fourth toothed pulley 1764 mounted on the drive shaft 1709 of the electric motor 1711. The drive shaft 1709, which coincides with the main longitudinal axis A of the vehicle, extends through a fourth toothed pulley 1764 and supports a 90-degree angle drive housing 1762 containing ring and pinion gears similar to those shown in FIG. 30. The ring and pinion gears rotate an output shaft 1715 that supports a fifth toothed pulley 1766. A third drive belt 1768 connects the fifth toothed pulley 1766 to a sixth toothed pulley 1770 which rotates about the rear wheel axle 1721 and is connected to the rear wheel 26.

Figure 33:
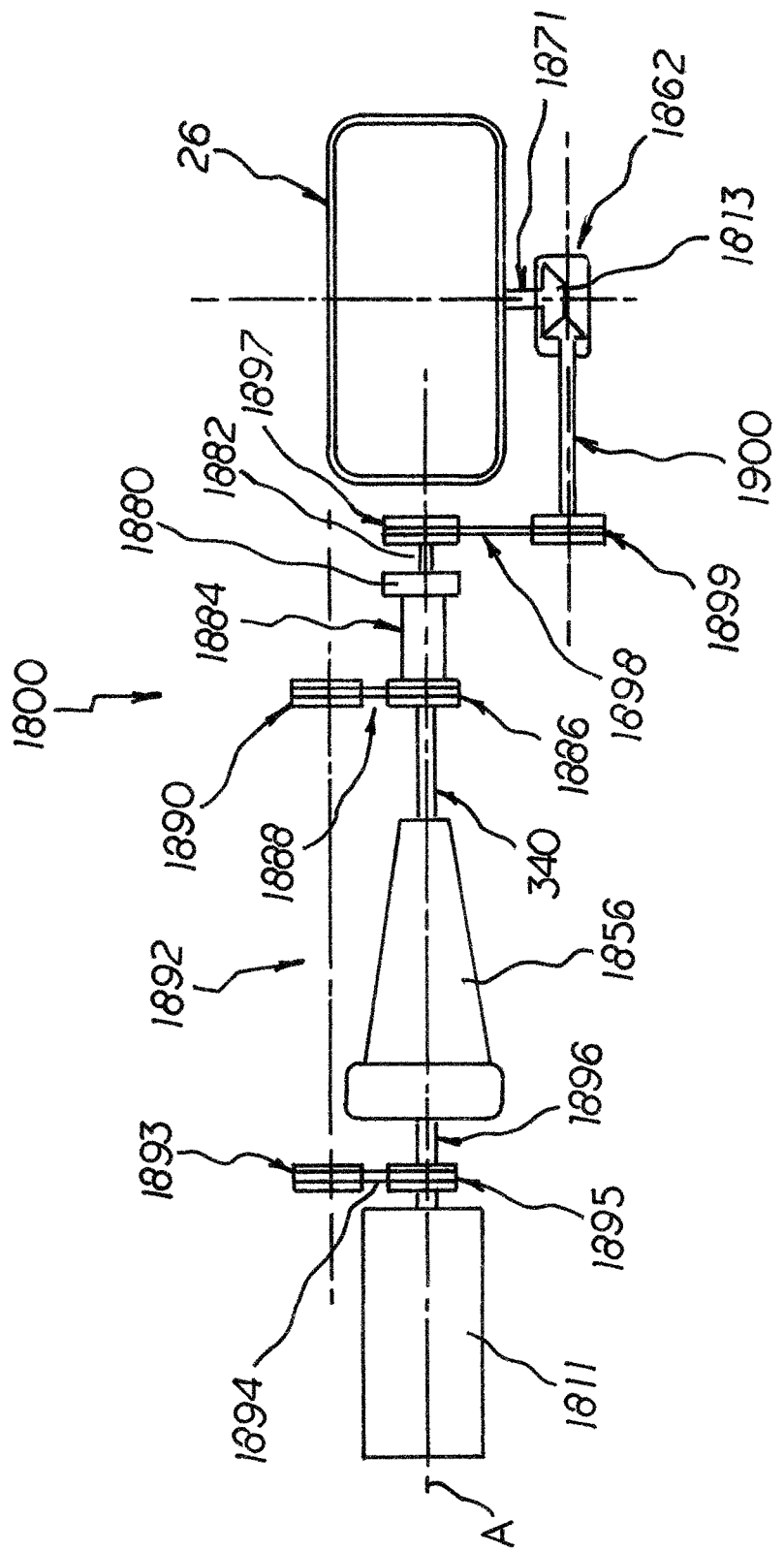
FIG. 33 is a schematic side view of still another embodiment of a hybrid power train usable with a vehicle according to the present disclosure.

FIG. 33 is a schematic top view of a hybrid power train 1800 according to another embodiment of the invention, from which overlying components such as the engine, clutch, primary output shaft, output toothed pulley, and upper drive shaft have been removed for the sake of clarity. Power from the upper drive belt is transmitted to a first toothed pulley 1880 mounted on a shaft 1882 extending from one end of a tube 1884 having a second toothed pulley 1886 secured to its opposite end. The first and second pulleys 1880, 1886 and the tube 1884 are all rotatable about the main longitudinal axis A of the vehicle. A first toothed pulley belt 1888 connects the second pulley 1886 to a third toothed pulley 1890 which is mounted at one end of a jack shaft 1892 extending parallel to the main longitudinal axis A. A fourth toothed pulley 1893 is mounted on the opposite end of the jack shaft 1892. A second toothed pulley belt 1894 connects the fourth toothed pulley 1893 to a fifth toothed pulley 1895 mounted on a shaft 1896 that connects the electric motor 1811 to the transmission 1856 and to a sixth toothed pulley 1897. A third toothed pulley belt 1898 couples the sixth toothed pulley 1897 to a seventh toothed pulley 1899. The seventh toothed pulley is mounted on a half shaft 1900 that extends into a 90-degree angle drive housing 1862, where it connects to a rotatable pinion gear 1813 attached to the rear wheel axle 1821 connected to the rear wheel 26. Alternatively, the various belts and pulleys could be replaced with internal transmission gear connections between the input and output shafts. One skilled in the art will recognize that power train and drive train arrangements other than those described above could also be employed and may be located in positions other than those described above.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
   an undercarriage centered over a contact point;
   an upper chassis coupled to the undercarriage and configured to pivot about a mobile longitudinal axis;
   a cradle assembly configured to allow the mobile longitudinal axis to move laterally relative to the contact point;
   the cradle assembly comprising a swing arm mounted for pivoting movement about a main longitudinal axis extending though the undercarriage, the swing arm including a first end that is coupled to the undercarriage and pivotable about the main longitudinal axis at a fixed pivot point on the undercarriage;
   the mobile longitudinal axis is parallel to the main longitudinal axis; and
   the swing arm also having a second end that is pivotably coupled to the upper chassis at an upper pivot point defining a third longitudinal axis that is parallel to the main longitudinal axis and the mobile longitudinal axis, with the upper pivot point is slidable in a lengthwise direction along the upper chassis.

2. The vehicle according to claim 1, wherein the cradle assembly further comprises a crank assembly including:
   a crank arm mounted for rotation about a crank axis extending through an intermediate portion of the swing arm;

a first shaft extending perpendicular to a first end of the crank arm and the intermediate portion of the swing arm, the first shaft defining the crank axis; and a second shaft extending perpendicular to the second end of the crank arm in an opposite direction to the first shaft;

wherein the second shaft is pivotably coupled to a lower portion of the upper chassis and defines the mobile longitudinal axis.

3. The vehicle according to claim 2, wherein the crank axis is parallel to the main longitudinal axis.

4. The vehicle according to claim 2, further comprising a motion conversion mechanism configured to transform rotational movement of the crank assembly into lateral translation of the mobile longitudinal axis.

5. The vehicle according to claim 4, wherein the motion conversion mechanism comprises a parallelogram linkage including:

a horizontal control arm pivotably coupled to the swing arm and the upper chassis; and a vertical control arm having a first end pivotably coupled to the horizontal control arm and a second end pivotably coupled to the undercarriage.

6. The vehicle according to claim 5, wherein the horizontal control arm is pivotably coupled to the swing arm at a pivot point located on the crank assembly axis.

7. The vehicle according to claim 1 wherein the swing arm comprises:

a tubular lower end pivotably secured to the undercarriage; and a rod having a first end and a second end, wherein the first end of the rod is telescopically received in the tubular lower end, and the second end of the rod includes a rod eye pivotably coupled to a pivot pin projecting from the upper chassis, wherein the pivot pin defines the mobile longitudinal axis.

8. The vehicle according to claim 1, wherein:

the undercarriage extends parallel to a level contact surface when the vehicle is traveling in a substantially straight direction on the level contact surface;

the upper chassis defines a vertical axis and has a neutral position wherein the vertical axis of the upper chassis extends perpendicular to the level contact surface when the vehicle is traveling in a substantially straight direction on the level contact surface;

the vehicle includes a set of wheels rotatably coupled to the undercarriage, each of the wheels defining a vertical axis that extends perpendicular to the level contact surface when the vehicle is traveling in the substantially straight direction on the contact surface; and the cradle assembly is configured to pivotably secure the upper chassis to the undercarriage and to allow the upper chassis to tilt from the neutral position to a leaning position wherein the vertical axis of the upper chassis extends at an oblique angle to the level contact surface, while the vertical axis of each wheel remains perpendicular to the level contact surface and the undercarriage remains parallel to the level contact surface.

9. A vehicle comprising:

an undercarriage extending parallel to a level contact surface when the vehicle is traveling in a substantially straight direction on the level contact surface;

an upper chassis having a length, the upper chassis being pivotably coupled to the undercarriage, the upper chassis defining a vertical axis and having a neutral position wherein the vertical axis of the upper chassis extends perpendicular to the level contact surface when the vehicle is traveling in a substantially straight direction on the level contact surface;

a set of wheels rotatably coupled to the undercarriage, each of the wheels defining a vertical axis that extends perpendicular to the level contact surface when the vehicle is traveling in the substantially straight direction on the contact surface; and a cradle assembly configured to pivotably secure the upper chassis to the undercarriage and to allow the upper chassis to tilt from the neutral position to a leaning position wherein the vertical axis of the upper chassis extends at an upper chassis lean angle, while the vertical axis of each wheel remains perpendicular to the level contact surface and the undercarriage remains parallel to the level contact surface, with the cradle assembly comprising a swing arm having a first end that is coupled to the undercarriage and pivotable about a fixed pivot point on the undercarriage, the swing arm having a second end that is pivotably coupled to the upper chassis at an upper pivot point which is slidable in a lengthwise direction along the upper chassis.

10. The vehicle according to claim 9, wherein the cradle assembly is configured to allow the upper chassis to remain in an upright position wherein the vertical axis of the upper chassis is perpendicular to a level reference when the vehicle is traveling on a canted contact surface extending at an oblique angle relative to the level reference.

11. The vehicle according to claim 9, wherein the cradle assembly is further configured to allow the vertical axis of each of the wheels to extend perpendicular to the canted contact surface when the vehicle is traveling along the canted surface.

12. The vehicle according to claim 9, wherein:

each of the wheels includes a tire having a width and having a bottom surface, with the bottom surface being flat throughout the width of the tire; and the cradle assembly is configured to allow the width of the bottom surface of each tire to engage the level contact surface when the upper chassis is in the leaning position.

13. The vehicle according to claim 9, wherein:

the undercarriage is centered over a contact point;

the cradle assembly swing arm first end pivotably coupling the swing arm to the undercarriage along a main longitudinal axis extending through the undercarriage, and the swing arm second end pivotably secured to the upper chassis along a mobile longitudinal axis that moves laterally relative to the contact point.

14. The vehicle according to claim 13, wherein the cradle assembly comprises an actuation system causing the upper chassis to tilt from the neutral position to the leaning position when the vehicle is turning a corner or traveling along a curve.

15. The vehicle according to claim 14, further comprising a control system coupled to the actuation system, the control system comprising:

at least one sensor configured to compare the upper chassis lean angle to a reference lean angle; and a processing unit coupled to the sensor and the actuation system and programmed to initiate the actuation system to reposition the upper chassis when the upper chassis lean angle is out of alignment with the reference lean angle.

* * * * *